US012096422B2

(12) United States Patent
Abedini et al.

(10) Patent No.: US 12,096,422 B2
(45) Date of Patent: Sep. 17, 2024

(54) BANDWIDTH PART (BWP) OPERATION AND ADAPTATION

(71) Applicant: QUALCOMM Incorporated, San Diego, CA (US)

(72) Inventors: Navid Abedini, Basking Ridge, NJ (US); Junyi Li, Fairless Hills, PA (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/342,151

(22) Filed: Jun. 27, 2023

(65) Prior Publication Data

US 2023/0403695 A1 Dec. 14, 2023

Related U.S. Application Data

(63) Continuation of application No. 17/367,103, filed on Jul. 2, 2021, now Pat. No. 11,729,761.

(51) Int. Cl.
*H04W 72/1263* (2023.01)
*H04W 16/28* (2009.01)
(Continued)

(52) U.S. Cl.
CPC ....... *H04W 72/1263* (2013.01); *H04W 16/28* (2013.01); *H04W 72/0453* (2013.01);
(Continued)

(58) Field of Classification Search
CPC . H04W 72/1263; H04W 72/23; H04W 16/28; H04W 72/0453; H04W 72/046; H04W 80/02
See application file for complete search history.

(56) References Cited

U.S. PATENT DOCUMENTS

2021/0143954 A1* 5/2021 Duan ................. H04W 52/0216
2021/0160842 A1* 5/2021 Bai ....................... H04W 72/046
(Continued)

FOREIGN PATENT DOCUMENTS

WO    WO-2018106043 A1 * 6/2018 ........... H04B 7/0617

OTHER PUBLICATIONS

Liu Y., et al., "True Time Delay Millimeter Wave Beam Steering with Integrated Optical Beamforming Network", Conference on Lasers and Electro-Optics (CLEO), IEEE, May 2019, 2 pages.

*Primary Examiner* — Mewale A Ambaye
(74) *Attorney, Agent, or Firm* — Kevin M. Donnelly; Norton Rose Fulbright US LLP

(57) ABSTRACT

This disclosure provides systems, methods, and apparatuses, including computer programs encoded on computer storage media, for wireless communication. In one aspect of the disclosure, a method for wireless communication performed by a user equipment (UE) includes receiving, from a base station, mapping information indicating, for each bandwidth part (BWP) of multiple BWPs, a mapping between a respective beam direction of multiple beam directions and the BWP. The method further includes receiving an allocation of a first BWP. The method also includes communicating, via the first BWP, one or more first messages using a first beam having a first beam direction, and receiving, from the base station, a change indicator associated with a second BWP or a second beam direction. The method includes communicating, via the second BWP, one or more second messages using a second beam having a second beam direction. Other aspects and features are also claimed and described.

30 Claims, 9 Drawing Sheets

(51) Int. Cl.
*H04W 72/044* (2023.01)
*H04W 72/0453* (2023.01)
*H04W 72/23* (2023.01)
*H04W 80/02* (2009.01)

(52) U.S. Cl.
CPC ......... *H04W 72/046* (2013.01); *H04W 72/23* (2023.01); *H04W 80/02* (2013.01)

(56) References Cited

U.S. PATENT DOCUMENTS

| | | | |
|---|---|---|---|
| 2021/0234604 A1* | 7/2021 | Raghavan | H04L 5/001 |
| 2021/0250156 A1* | 8/2021 | Kim | H04W 72/53 |
| 2021/0250944 A1* | 8/2021 | Ji | H04W 72/21 |
| 2021/0251014 A1* | 8/2021 | Agiwal | H04L 5/0044 |
| 2021/0273742 A1* | 9/2021 | Xu | H04L 5/0053 |
| 2022/0141862 A1* | 5/2022 | Bai | H04B 7/088 |
| | | | 370/329 |
| 2023/0007672 A1 | 1/2023 | Abedini | |

* cited by examiner

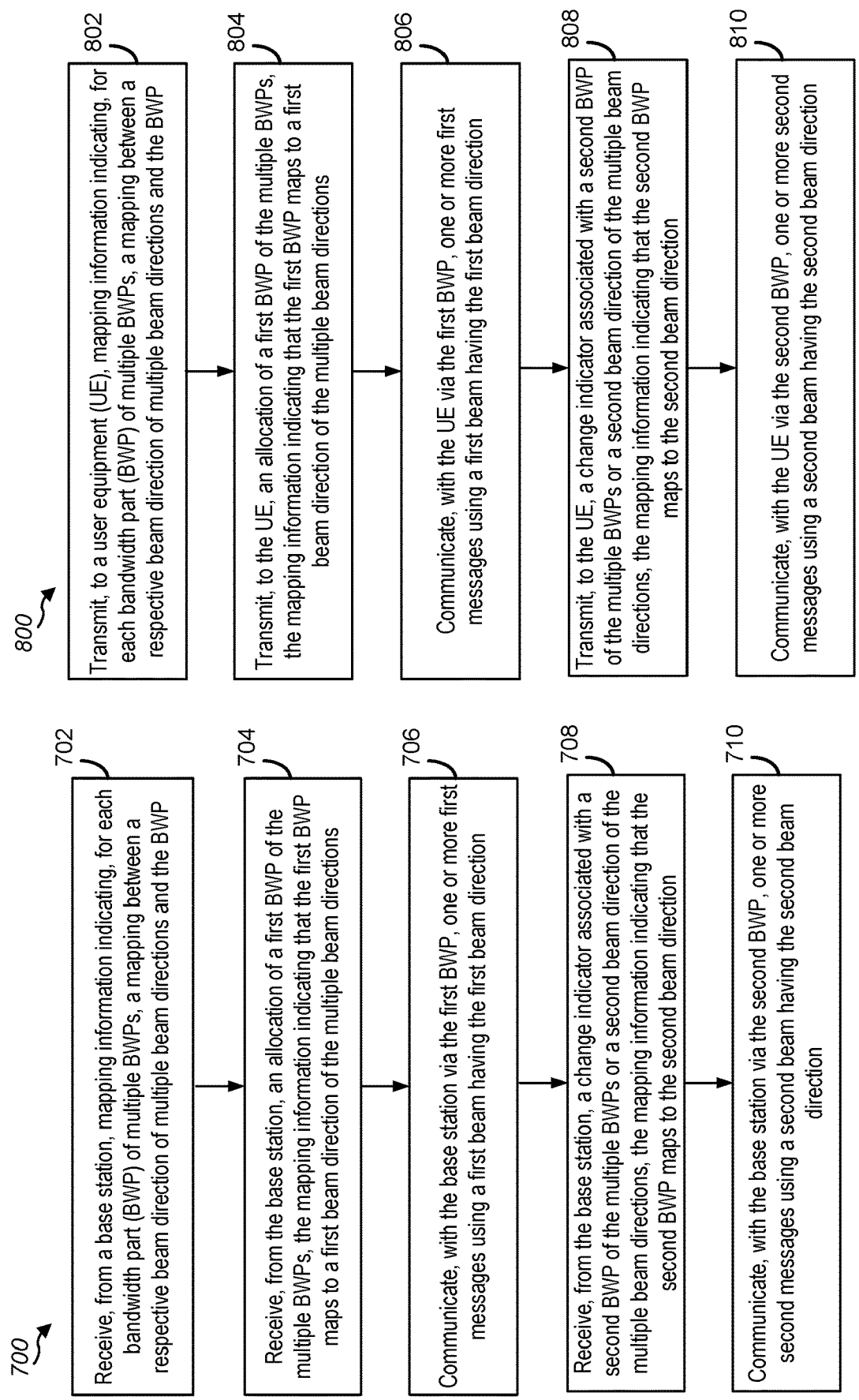

BANDWIDTH PART (BWP) OPERATION AND ADAPTATION

PRIORITY INFORMATION

The present application for patent is a Continuation of U.S. patent application Ser. No. 17/367,103 filed 2 Jul. 2021 and entitled "BANDWIDTH PART (BWP) OPERATION AND ADAPTATION," which is assigned to the assignee hereof and hereby expressly incorporated by reference herein.

TECHNICAL FIELD

Aspects of the present disclosure relate generally to wireless communication systems, and more particularly, to bandwidth part (BWP) operation and adaptation, such as BWP switching.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A mobile communication device may be configured to operate within a reduced portion of an available system bandwidth referred to as a bandwidth part (BWP). By operating in the BWP, the mobile communication device may reduce its consumption of processing and power resources because it does not need to monitor the entire available bandwidth to communicate with other devices, such as a base station. When the mobile communication device uses analog beamforming, to operate in different BWPs and in different directions, the mobile communication device utilizes multiple processing chains which are each configured for a different, discrete directional communication beam. Additionally, for a base station to communicate with multiple UEs in the same direction via different BWPs, or with multiple UEs in different directions, multiple processing chains are utilized by the base station. For each of the UEs and the base station, increasing the number of processing chains increases cost and power consumption of the respective device. Additionally, as a mobile communication device moves between beam directions with respect to the base station, the mobile communication device may transition from monitoring a first BWP associated with a first beam to monitoring a second BWP associated with a second beam. If the two BWPs are sufficiently far apart in the frequency domain, the change in frequency may result in errors or communication failure as the mobile communication device transitions to using a different processing chain to account for the change in communication beams and BWP.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method for wireless communication performed by a user equipment (UE). The method includes receiving, from a base station, mapping information indicating, for each bandwidth part (BWP) of multiple BWPs, a mapping between a respective beam direction of multiple beam directions and the BWP. The method also includes receiving, from the base station, an allocation of a first BWP of the multiple BWPs, the mapping information indicating that the first BWP maps to a first beam direction of the multiple beam directions. The method further includes communicating, with the base station via the first BWP, one or more first messages using a first beam having the first beam direction, and receiving, from the base station, a change indicator associated with a second BWP of the multiple BWPs or a second beam direction of the multiple beam directions, the mapping information indicating that the second BWP maps to the second beam direction. The method further includes communicating, with the base station via the second BWP, one or more second messages using a second beam having the second beam direction.

Another innovative aspect of the subject matter described in this disclosure can be implemented in a UE. The UE includes at least one processor and a memory coupled with the at least one processor and storing processor-readable instructions that, when executed by the at least one processor, are configured to receive, from a base station, mapping information indicating, for each BWP of multiple BWPs, a mapping between a respective beam direction of multiple beam directions and the BWP. The processor-readable instruction, when executed by the at least one processor, are further configured to receive, from the base station, an allocation of a first BWP of the multiple BWPs, the mapping information indicating that the first BWP maps to a first beam direction of the multiple beam directions. The processor-readable instruction, when executed by the at least one processor, are further configured to communicate, with the base station via the first BWP, one or more first messages using a first beam having the first beam direction, and receive, from the base station, a change indicator associated with a second BWP of the multiple BWPs or a second beam direction of the multiple beam directions, the mapping information indicating that the second BWP maps to the second beam direction. The processor-readable instruction, when executed by the at least one processor, are further configured to communicate, with the base station via the second BWP, one or more second messages using a second beam having the second beam direction.

Another innovative aspect of the subject matter described in this disclosure can be implemented in an apparatus configured for wireless communication. The apparatus includes means for receiving, from a base station, mapping information indicating, for each BWP of multiple BWPs, a mapping between a respective beam direction of multiple beam directions and the BWP. The apparatus also includes means for receiving, from the base station, an allocation of a first BWP of the multiple BWPs, the mapping information indicating that the first BWP maps to a first beam direction of the multiple beam directions. The apparatus further includes means for communicating, with the base station via the first BWP, one or more first messages using a first beam having the first beam direction, and means for receiving, from the base station, a change indicator associated with a second BWP of the multiple BWPs or a second beam direction of the multiple beam directions, the mapping information indicating that the second BWP maps to the second beam direction. The apparatus also includes means for communicating, with the base station via the second BWP, one or more second messages using a second beam having the second beam direction.

Another innovative aspect of the subject matter described in this disclosure can be implemented in a non-transitory computer-readable medium storing instructions that, when executed by a processor, cause the processor to perform operations including receiving, from a base station, mapping information indicating, for each BWP of multiple BWPs, a mapping between a respective beam direction of multiple beam directions and the BWP. The operations further including receiving, from the base station, an allocation of a first BWP of the multiple BWPs, the mapping information indicating that the first BWP maps to a first beam direction of the multiple beam directions. The operations also including communicating, with the base station via the first BWP, one or more first messages using a first beam having the first beam direction, and receiving, from the base station, a change indicator associated with a second BWP of the multiple BWPs or a second beam direction of the multiple beam directions, the mapping information indicating that the second BWP maps to the second beam direction. The operations further including communicating, with the base station via the second BWP, one or more second messages using a second beam having the second beam direction.

Another innovative aspect of the subject matter described in this disclosure can be implemented in a method for wireless communication performed by a base station. The method includes transmitting, to a UE, mapping information indicating, for each BWP of multiple BWPs, a mapping between a respective beam direction of multiple beam directions and the BWP. The method also includes transmitting, to the UE, an allocation of a first BWP of the multiple BWPs, the mapping information indicating that the first BWP maps to a first beam direction of the multiple beam directions. The method further includes communicating, with the UE via the first BWP, one or more first messages using a first beam having the first beam direction, and transmitting, to the UE, a change indicator associated with a second BWP of the multiple BWPs or a second beam direction of the multiple beam directions, the mapping information indicating that the second BWP maps to the second beam direction. The method also includes communicating, with the UE via the second BWP, one or more second messages using a second beam having the second beam direction.

Another innovative aspect of the subject matter described in this disclosure can be implemented in a base station. The base station includes at least one processor and a memory coupled with the at least one processor and storing processor-readable instructions that, when executed by the at least one processor, are configured to transmit, to a UE, mapping information indicating, for each BWP of multiple BWPs, a mapping between a respective beam direction of multiple beam directions and the BWP. The processor-readable instruction, when executed by the at least one processor, are further configured to transmit, to the UE, an allocation of a first BWP of the multiple BWPs, the mapping information indicating that the first BWP maps to a first beam direction of the multiple beam directions. The processor-readable instruction, when executed by the at least one processor, are also configured to communicate, with the UE via the first BWP, one or more first messages using a first beam having the first beam direction, and transmit, to the UE, a change indicator associated with a second BWP of the multiple BWPs or a second beam direction of the multiple beam directions, the mapping information indicating that the second BWP maps to the second beam direction. The processor-readable instruction, when executed by the at least one processor, are further configured to communicate, with the UE via the second BWP, one or more second messages using a second beam having the second beam direction.

Another innovative aspect of the subject matter described in this disclosure can be implemented in an apparatus configured for wireless communication. The apparatus includes means for transmitting, to a UE, mapping information indicating, for each BWP of multiple BWPs, a mapping between a respective beam direction of multiple beam directions and the BWP. The apparatus includes also means for transmitting, to the UE, an allocation of a first BWP of the multiple BWPs, the mapping information indicating that the first BWP maps to a first beam direction of the multiple beam directions. The first BWP maps to a first beam direction based on mapping information. The apparatus further includes means for communicating, with the UE via the first BWP, one or more first messages using a first beam having the first beam direction, and means for transmitting, to the UE, a change indicator associated with a second BWP of the multiple BWPs or a second beam direction of the multiple beam directions, the mapping information indicating that the second BWP maps to the second beam direction. The apparatus includes also means for communicating, with the UE via the second BWP, one or more second messages using a second beam having the second beam direction.

Another innovative aspect of the subject matter described in this disclosure can be implemented in a non-transitory computer-readable medium storing instructions that, when executed by a processor, cause the processor to perform operations including transmitting, to a UE, mapping information indicating, for each BWP of multiple BWPs, a mapping between a respective beam direction of multiple beam directions and the BWP. The operations also including transmitting, to the UE, an allocation of a first BWP of the multiple BWPs, the mapping information indicating that the first BWP maps to a first beam direction of the multiple beam directions. The operations further including communicating, with the UE via the first BWP, one or more first messages using a first beam having the first beam direction, and transmitting, to the UE, a change indicator associated with a second BWP of the multiple BWPs or a second beam direction of the multiple beam directions, the mapping information indicating that the second BWP maps to the second beam direction. The operations also including communicating, with the UE via the second BWP, one or more second messages using a second beam having the second beam direction.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a flow diagram illustrating an example process that supports BWP switching according to one or more aspects of the present disclosure.

FIG. 8 is a flow diagram illustrating an example process that supports BWP switching according to one or more aspects of the present disclosure.

Like reference numbers and designations in the various drawings indicate like elements.

DETAILED DESCRIPTION

Figure 1:
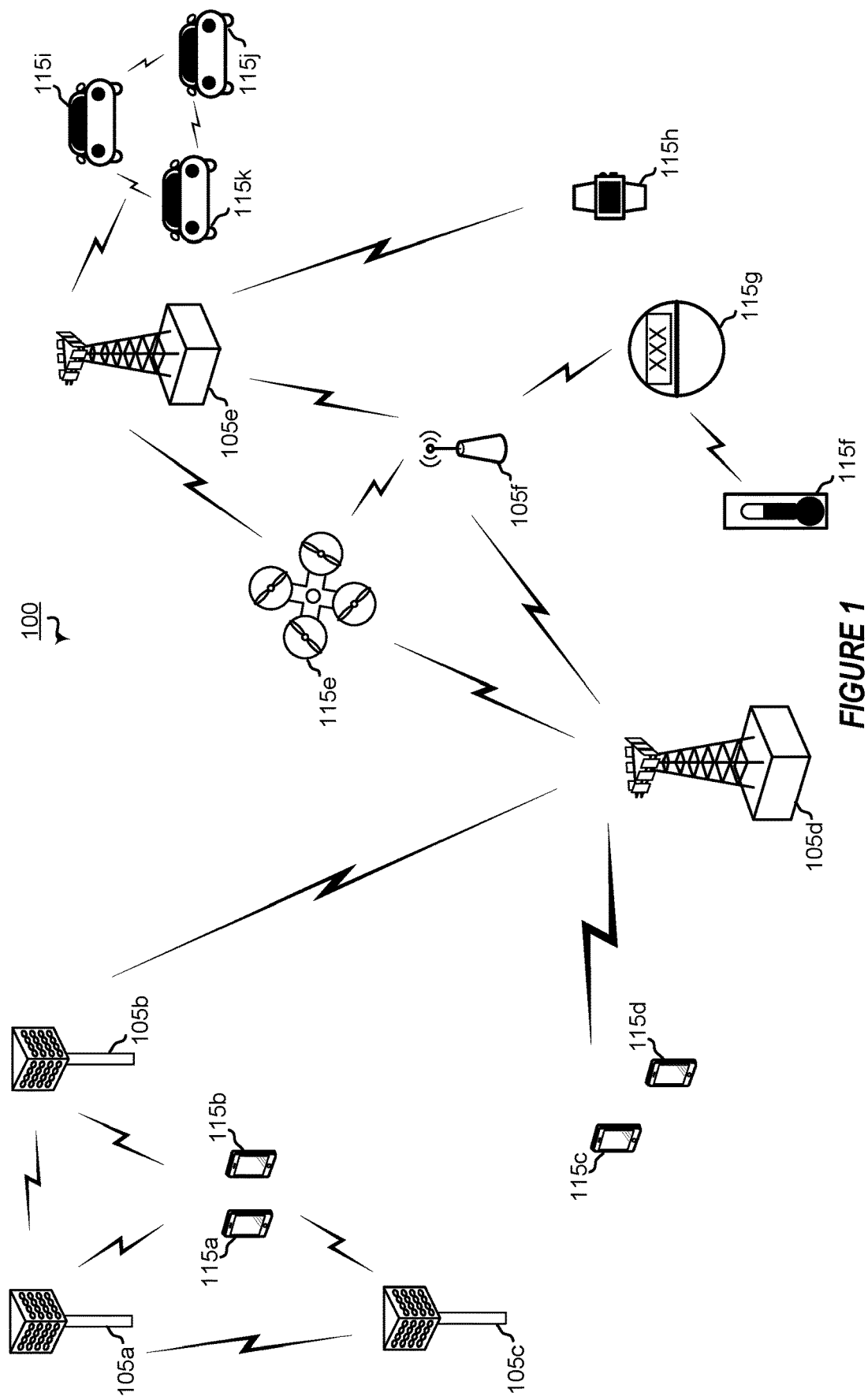
FIG. 1 is a block diagram illustrating details of an example wireless communication system according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The electromagnetic spectrum is often subdivided, based on frequency (or wavelength), into various classes, bands or channels. In fifth generation (5G) new radio (NR), two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band (or spectrum) in documents and articles, despite being different than the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A mobile communication device may be configured to operate within a reduced portion of an available system bandwidth referred to as a bandwidth part (BWP). By operating in the BWP, the mobile communication device may reduce its consumption of processing and power resources because it does not need to monitor the entire available bandwidth to communicate with other devices, such as a base station. A mobile communication device may also utilize millimeter wave (mmWave) communication techniques for transmission and reception, which often rely on analog beamforming. However, when the mobile communication device uses analog beamforming, the analog beamforming typically results in a communication beam that points in one direction. Accordingly, to operate in different BWPs and in different directions, the mobile communication device utilizes multiple processing chains which increases a cost of the mobile communication device as well as power consumption at the mobile communication device and at a base station serving the mobile communication device. A mobile communication device that includes multiple processing chains may include a respective processing chain configured for each different, discrete directional communication beam. In addition to increasing costs and power consumption at mobile communication devices such as user equipments (UEs), supporting communication with UEs in different directions and via different BWPs increases costs at a base station. To illustrate, a single processing chain of a base station is typically capable, through use of analog beamforming techniques, to transmit or receiving signaling or data to one or more UEs in a single direction and via a single BWP. To communicate with multiple UEs in the same direction via different BWPs, or with multiple UEs in different directions, multiple processing chains are utilized by the base station. Similar to a UE, increasing the number of processing chains at a base station increases a cost of the base station and power consumption at the base station.

Additionally, supporting communications between a base station and UEs in multiple directions or via multiple BWPs increases signaling overhead in a wireless network. To illustrate, a mobile communication device that includes multiple processing chains may configure the multiple processing chains based on radio resource control (RRC) signaling from the base station, such as to achieve particular directions of communication or to monitor particular BWPs. After configuration of the multiple processing chains, the mobile communication device may move within a coverage area of the base station. If the mobile communication device moves far enough from an original position, the mobile communication device, the base station, or both may change communication beams to beams having different directions based on changing channel conditions as the mobile communication device moves. In order to change a configuration of a processing chain, the mobile communication device typically implements a new configuration that is received via signaling from the base station, which increases signaling overhead and delays communication between the mobile communication device and the base station. Additionally, as a mobile communication device moves between beam directions with respect to the base station, the mobile communication device may transition from monitoring a first BWP associated with a first beam to monitoring a second BWP associated with a second beam. If the two BWPs are sufficiently far apart in the frequency domain, the change in frequency may result in errors or communication failure as the mobile communication device transitions to using a different processing chain to account for the change in direction and BWP.

The present disclosure provides systems, apparatus, methods, and computer-readable media for BWP switching. In some particular aspects, a base station may transmit, to a user equipment (UE), mapping information that indicates, for each BWP of multiple BWPs, a mapping between a respective beam direction of multiple beam directions and the BWP. For example, the mapping information may indicate that a first BWP maps to a first beam direction, and a second BWP maps to a second beam direction. The multiple beam directions may correspond to a single beam or to multiple beams, and the mapping may be UE-specific, such that a beam refers to a transmit beam or a receive beam of the UE, or cell-specific, such that a beam refers to resources used by the base station to communicate, such as synchronization signal blocks (SSBs) or channel state information (CSI) reference signals (CSI-RSs). The UE may configure the first BWP as an active BWP and communicate, with the base station via the first BWP, one or more first messages using a beam having the first beam direction. After the configuration of the first BWP as the active BWP, the base station may transmit, to the UE, a change indicator associated with the second BWP of the multiple BWPs or the second beam direction of the multiple beam directions. The UE may use the mapping information to determine, based on the change indicator, the second BWP and the second beam direction. The UE may then configure the second BWP as the active BWP and communicate, with the base station via the second BWP, one or more second messages using a beam (either the same beam after adjustment or a different beam) having the second beam direction.

Particular implementations of the subject matter described in this disclosure can be implemented to realize one or more of the following potential advantages. In some aspects, the present disclosure provides techniques for BWP switching may result in a UE experiencing few errors or communication failures due to large frequency shifts that would be experienced in wireless communication systems that do not support this granularity of mapping between beam directions and BWPs. To illustrate, different UEs may be allocated different BWPs and in different directions with reduced complexity, such that a wireless communication devices of the present disclosure may be configured to use a single processing chain to communicate via multiple different BWPs in different beam directions instead of requiring wireless communication devices to include individual processing chains for each discrete directional communication beam and for each discrete BWP associated with a same direction as with conventional techniques. Reducing the number of processing chains included in wireless communication devices reduces complexity, cost and power consumption by the wireless communication devices. The present disclosure also provides techniques for efficient BWP switching such that a UE may gradually, on a more granular level, adjust or change a BWP as the UE moves and changes position with respect to the base station, as compared to other wireless communication systems. Furthermore, the described mapping information may be communicated during an association process or at another time, instead of being communicated as the UE changes each BWP or beam direction, thereby reducing the signaling overhead. Additionally or alternatively, the base station may transmit a message, such as a downlink control information (DCI) or a medium access control-control element (MAC-CE), to initiate the UE to change a BWP or beam direction as the UE changes position within an area covered by one beam, such that the UE may gradually change BWPs being monitored as the UE changes beam directions with respect to the base station instead of being handed off from one beam to another in order to change BWPs or to change directions. By enabling a more gradual change of BWP during movement, the UE may experience fewer errors or communication failures due to large frequency shifts that would be experienced in wireless communication systems that do not support this granularity of mapping between beam directions and BWPs.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or UEs. A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10 s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~0.99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust mmWave transmissions, advanced channel coding, and device-centric mobility. Scalability of the numerology in NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, MHz, and the like bandwidth. For other various outdoor and small cell coverage deployments of TDD greater than 3 GHz, subcarrier spacing may occur with 30 kHz over or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such as the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
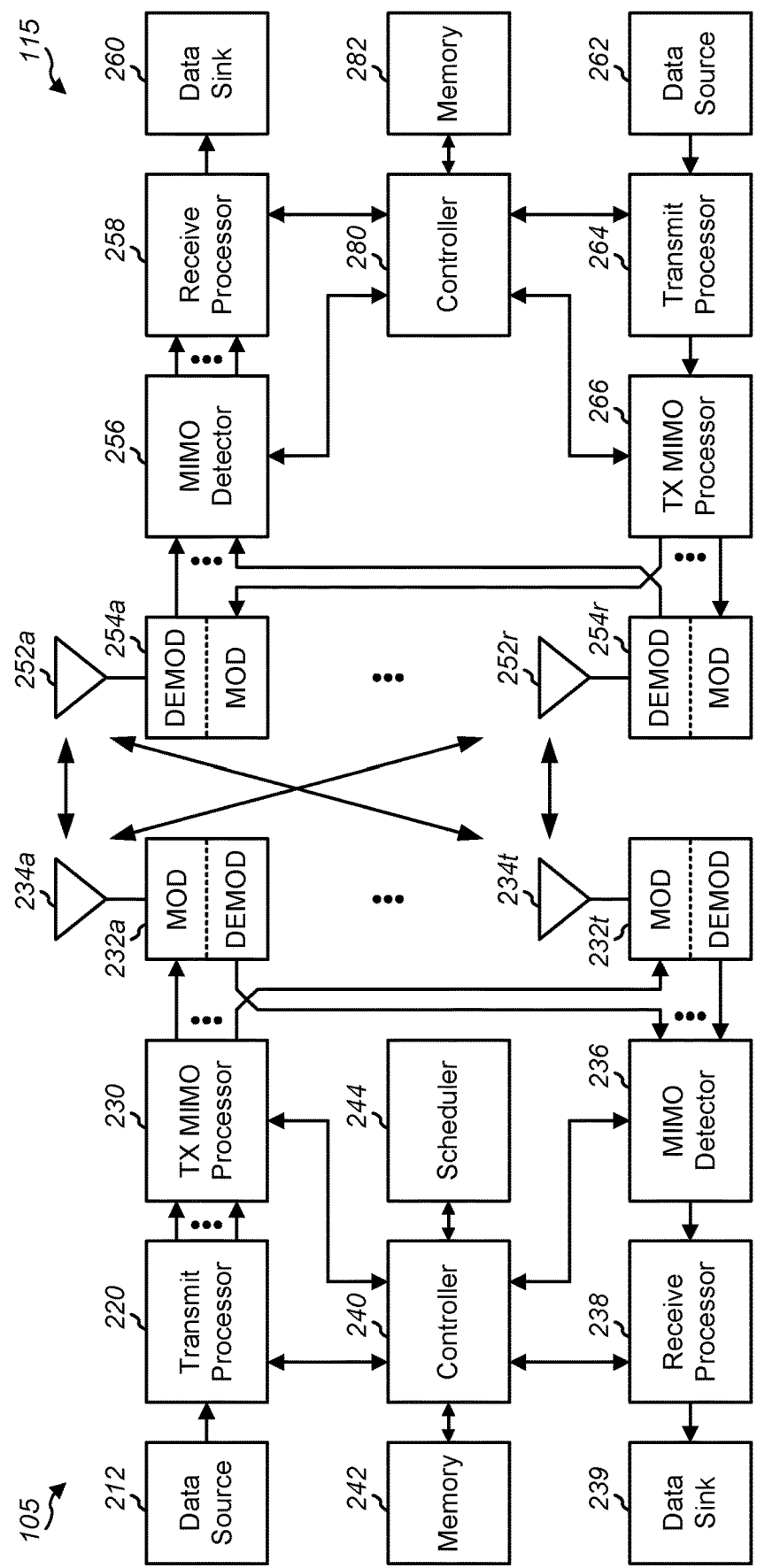
FIG. 2 is a block diagram illustrating examples of a base station and a user equipment (UE) according to one or more aspects.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 7 and 8, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3:
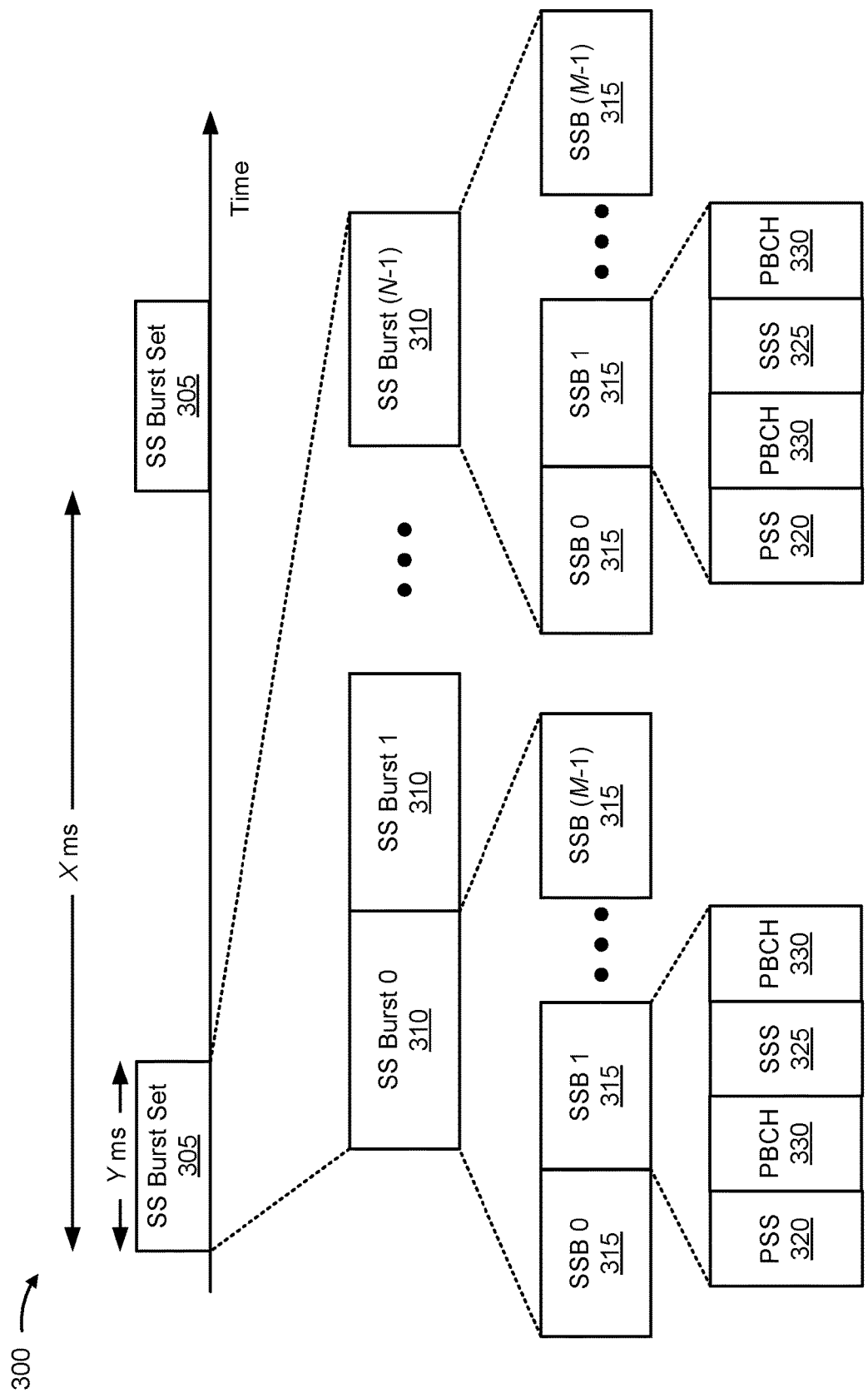
FIG. 3 is a diagram illustrating an example of a synchronization signal (SS) hierarchy according to one or more aspects of the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. As further shown, each SS burst 310 may include one or more SS blocks (SSBs) 315, shown as SSB 0 through SSB M−1, where M is a maximum number of SSBs 315 that can be carried by an SS burst 310. In some aspects, different SSBs 315 may be beamformed differently, such as transmitted using different beams, and may be used for cell search, cell acquisition, beam management, or beam selection—as part of an initial network access procedure. An SS burst set 305 may be periodically transmitted by a wireless node, such as BS 105, such as every X milliseconds (ms), as shown in FIG. 3. In some aspects, an SS burst set 305 may have a fixed or dynamic length, shown as Y ms in FIG. 3. In some cases, an SS burst set 305 or an SS burst 310 may be referred to as a discovery reference signal (DRS) transmission window or an SSB measurement time configuration (SMTC) window.

In some aspects, an SSB 315 may include resources that carry a primary synchronization signal (PSS) 320, a secondary synchronization signal (SSS) 325, or a physical broadcast channel (PBCH) 330. In some aspects, multiple SSBs 315 are included in an SS burst 310, such as with transmission on different beams, and the PSS 320, the SSS 325, or the PBCH 330 may be the same across each SSB 315 of the SS burst 310. In some aspects, a single SSB 315 may be included in an SS burst 310. In some aspects, the SSB 315 may be at least four symbols, such as orthogonal frequency division multiplexing (OFDM) symbols, in length, where each symbol carries one or more of the PSS 320 (e.g., occupying one symbol), the SSS 325 (e.g., occupying one symbol), or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources, such as consecutive symbols, during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node, such as a BS 105, according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE may monitor for or measure SSBs 315 using different receive (Rx) beams during an initial network access procedure or a cell search procedure, among other examples. Based at least in part on the monitoring or measuring, the UE may indicate one or more SSBs 315 with a best signal parameter, such as a reference signal received power (RSRP) parameter, to a BS. The BS and the UE may use the one or more indicated SSBs 315 to select one or more beams to be used for communication between the BS and the UE, such as for a random access channel (RACH) procedure. Additionally, or alternatively, the UE may use the SSB 315 or the SSB index to determine a cell timing for a cell, such as a serving cell, via which the SSB 315 is received.

In some aspects, a wireless node, such as a BS, may use a true-time-delay array architecture for frequency division multiplexing (FDM)-based beam sweeping associated with transmission of an SSB 315 rather than time division multiplexing (TDM)-based beam sweeping. When using a true-time-delay architecture, the wireless node may transmit the M repetitions of an SSB 315 in different frequency sub-bands via a true-time-delay array. For example, the wireless node may transmit different repetitions of an SSB 315 in different directions and using different, discrete, frequency division multiplexed reference signals. A UE may measure one or more of the different, discrete, frequency division multiplexed reference signals to enable beam management procedures.

Figure 4:
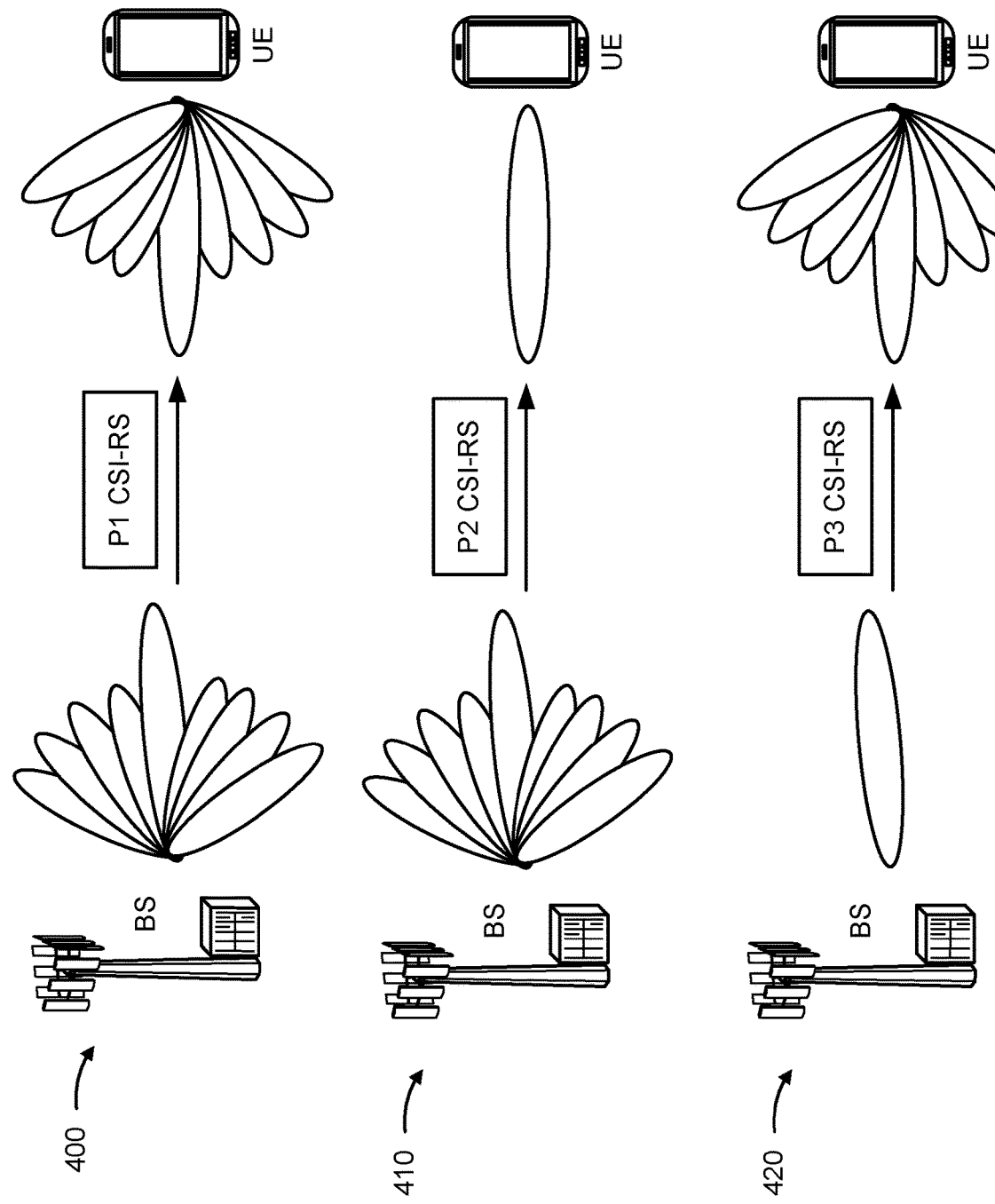
FIG. 4 is a diagram illustrating an example of channel state information (CSI) reference signal (RS) (CSI-RS) beam management procedures according to one or more aspects of the present disclosure.

FIG. 4 is a diagram illustrating examples 400, 410, and 420 of channel state information (CSI) reference signal (RS) (CSI-RS) beam management procedures according to one or more aspects of the present disclosure. As shown in FIG. 4, examples 400, 410, and 420 include a UE in communication with a BS in a wireless network. However, the devices shown in FIG. 4 are provided as examples, and the wireless network may support communication and beam management between other devices, such as between a UE and a BS or transmit receive point (TRP), between a mobile termination node and a control node, between an integrated access and backhaul (IAB) child node and an IAB parent node, or between a scheduled node and a scheduling node. In some aspects, the UE and the BS may be in a connected state, such as an RRC connected state.

As shown in FIG. 4, example 400 may include a BS and a UE communicating to perform beam management using CSI-RSs. Example 400 depicts a first beam management procedure, such as P1 CSI-RS beam management. The first beam management procedure may be referred to as a beam selection procedure, an initial beam acquisition procedure, a beam sweeping procedure, a cell search procedure, or a beam search procedure. As shown in FIG. 4 and example 400, CSI-RSs may be configured to be transmitted from the BS to the UE. The CSI-RSs may be configured to be periodic (e.g., using RRC signaling), semi-persistent (e.g., using media access control (MAC) control element (MAC-CE) signaling), or aperiodic (e.g., using downlink control information (DCI)).

The first beam management procedure may include the BS performing beam sweeping over multiple, discrete transmit (Tx) beams. The BS may transmit a CSI-RS using each transmit beam for beam management. To enable the UE to perform receive (Rx) beam sweeping, the BS may use a transmit beam to transmit (e.g., with repetitions) each CSI-RS at multiple times within the same RS resource set so that the UE can sweep through receive beams in multiple transmission instances. For example, if the BS has a set of K transmit beams and the UE has a set of L receive beams, the CSI-RS may be transmitted on each of the K transmit beams L times so that the UE may receive L instances of the CSI-RS per transmit beam. In other words, for each transmit beam of the BS, the UE may perform beam sweeping through the receive beams of the UE. As a result, the first beam management procedure may enable the UE to measure a CSI-RS on different transmit beams using different receive beams to support selection of BS transmit beams/UE receive beam(s) beam pair(s). The UE may report the measurements to the BS to enable the BS to select one or more beam pairs for communication between the BS and the UE. While example 400 has been described in connection with CSI-RSs, the first beam management process may also use SSBs for beam management in a similar manner as described above. For example, as described above, a BS may transmit an SSB to a UE to enable determination of a beam pair for communication.

As shown in FIG. 4, example 410 may include a BS and a UE communicating to perform beam management using CSI-RSs. Example 410 depicts a second beam management procedure, such as P2 CSI-RS beam management. The second beam management procedure may be referred to as a "beam refinement procedure", a "base station beam refinement procedure", a "TRP beam refinement procedure", or a "transmit beam refinement procedure". As shown in FIG. 4 and example 410, CSI-RSs may be configured to be transmitted from the BS to the UE. The CSI-RSs may be configured, such as using downlink control information (DCI), to be aperiodic. The second beam management procedure may include the BS performing beam sweeping over one or more transmit beams. The one or more transmit beams may be a subset of all transmit beams associated with the BS. For example, the one or more transmit beams may be determined based at least in part on measurements reported by the UE in connection with the first beam management procedure. The BS may transmit a CSI-RS using each transmit beam of the one or more transmit beams for beam management. The UE may measure each CSI-RS using a single receive beam. For example, the UE may measure each CSI-RS using the same receive beam that is determined based at least in part on measurements performed in connection with the first beam management procedure. The second beam management procedure may enable the BS to select a best transmit beam based at least in part on measurements of the CSI-RSs reported by the UE. For example, the measurements of the CSI-RSs may be measured by the UE using the single receive beam.

As shown in FIG. 4, example 420 depicts a third beam management procedure, such as P3 CSI-RS beam management. The third beam management procedure may be referred to as a "beam refinement procedure", a "UE beam refinement procedure", or a "receive beam refinement procedure". As shown in FIG. 4 and example 420, one or more CSI-RSs may be configured to be transmitted from the BS to the UE. The CSI-RSs may be configured, such as using DCI, to be aperiodic. The third beam management process may include the BS transmitting the one or more CSI-RSs using a single transmit beam, such as determined based at least in part on measurements reported by the UE in connection with the first beam management procedure or the second beam management procedure. To enable the UE to perform receive beam sweeping, the base station may use a transmit beam to transmit (e.g., with repetitions) CSI-RS at multiple times within the same RS resource set so that the UE can sweep through one or more receive beams in multiple transmission instances. The one or more receive beams may be a subset of all receive beams associated with the UE. The one or more receive beams may be determined based at least in part on measurements performed in connection with the first beam management procedure or the second beam management procedure. The third beam management procedure may enable the BS or the UE to select a best receive beam based at least in part on the reported measurements received from the UE (e.g., of the CSI-RS of the transmit beam using the one or more receive beams).

As indicated above, FIG. 4 is provided as an example of beam management procedures. Other examples of beam management procedures may differ from what is described with respect to FIG. 4. For example, the UE and the BS may perform the third beam management procedure before performing the second beam management procedure, or the UE and the BS may perform a similar beam management procedure to select a UE transmit beam.

In an analog beamforming array, a transmitter device, such as a BS 105, transmits a signal from array elements using different beamforming weights $w_i$. When a transmitted signal is not frequency selective in a wireless channel (e.g., a bandwidth of a transmission waveform is approximately the same as a coherent bandwidth of the wireless channel), a receiver device, such as a UE 120, receives a signal that is frequency flat (e.g., each frequency component of the transmission waveform experiences approximately the same behavior with respect to, for example, fading).

However, in a true-time-delay array, which may also be referred to as a "true-time-delay analog array", a "true-time-delay architecture", or a "true-time-delay analog array architecture", among other examples, the transmitter device applies a set of different time delays, in addition to the different beamforming weights, to repetitions of the signal. For example, assume a wideband (e.g., spanning multiple tones) signal S that is to be transmitted by an array of antenna elements, where each antenna element i multiplies signal S by its respective beamforming weight, $w_i$, as mentioned above. In this true-time-delay architecture, each antenna element i would, in addition to multiplying signal S by its respective beamforming weight, apply a time delay, $d_i$. In one mathematical representation, each antenna element i would transmit signal $Y_i$, where signal $Y_i(t)=w_i * S(t-d_i)$. A fixed time delay or time shift, $d_i$, across the antenna elements in time domain can result in a frequency dependent phase shift in the frequency domain. As such, the time delay, $d_i$, applied to each antenna element can be understood as a different frequency domain phase offset value being introduced to each tone of signal S. This phase offset can result in each tone being transmitted in a different direction. As such, when the transmitter device transmits using a true-time-delay array, the transmitter device transmits using beamforming that is frequency selective with respect to different transmit directions. While the signal S has been described above as being multiplied by beamforming weights, it is understood that such a multiplication in mathematical terms may be implemented in hardware in an antenna array, or circuitry associated with an antenna array, using different components such as phase shifters, power amplifiers, or the like.

Figure 5:
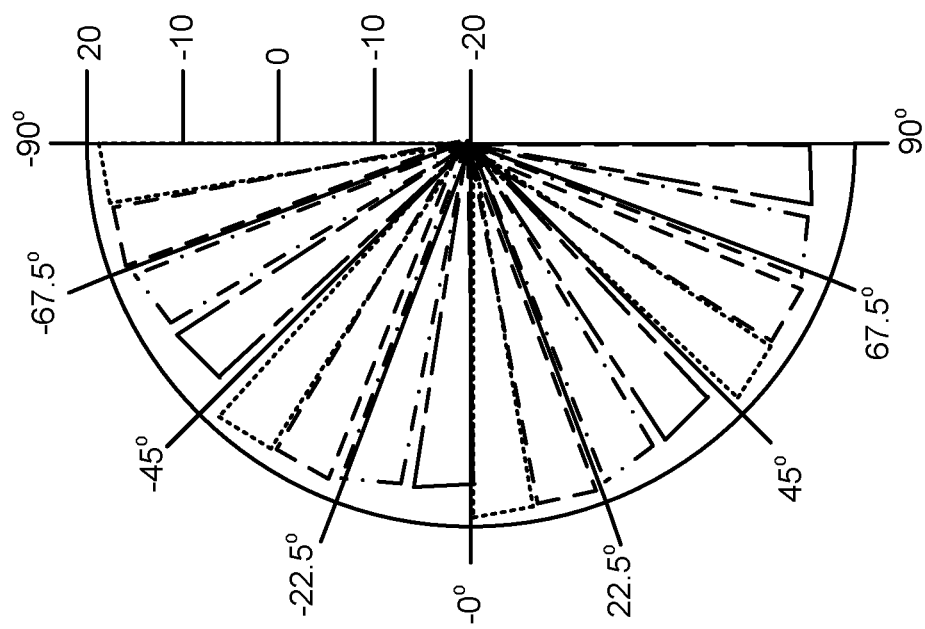
FIG. 5 is a diagram illustrating an example of true-time-delay beamforming according to one or more aspects of the present disclosure.

FIG. 5 is a diagram illustrating an example 500 of true-time-delay beamforming according to one or more aspects. As shown in FIG. 5, signals associated with different portions of a frequency are pointed in different directions. For example, a transmitter device may transmit a first sub-band of a frequency band in a first direction and a second sub-band of the frequency band in a second direction that is different than the first direction. In one example, each sub-band within the frequency band can correspond to a resource element, such that each resource element has a different frequency but is transmitted at a same time. In this way, a BS 105 may concurrently transmit a plurality of repetitions of a communication in different frequency sub-bands, which may correspond to the sub-bands of the frequency band that are covered by different signals transmittable using a true-time-delay array. Similarly, the BS 105 may receive signals from different directions concurrently from a plurality of UEs 120 using a true-time-delay array, which may be referred to as a "receive true-time-delay array" or an "Rx true-time-delay array", among other examples. In this case, a receive direction of a first communication may correspond to a transmit direction of a second communication that triggered the first communication. Further, sub-bands used for transmission may correspond to sub-bands used for reception so that the BS 105 transmits a repetition of a communication on a particular sub-band using the true-time-delay array and receives a response to the communication on the particular sub-band.

As described above, to perform beam management or beam refinement procedures, a BS may transmit a plurality of discrete, frequency division multiplexed reference signals for measurement by a UE. The UE may report a result of one or more measurements to enable the BS to determine a beam direction, a transmit power, or a beam angle, among other examples. However, a granularity of such beam management or beam refinement procedures may be limited by a quantity of discrete reference signals that are transmitted.

Some aspects described herein enable a BS to use a true-time-delay analog array to transmit a wideband, frequency-selective beam across a plurality of different resource elements and directions such that each direction of the plurality of directions is associated with a different resource element of the plurality of resource elements where the plurality resource elements can be defined by a plurality of resource element (RE) offsets relative to a reference RE. In this case, the UE may perform measurements of the beam at the plurality of RE offsets and report a result of the measurements to the BS or a control node to enable a beam management or beam refinement procedure. Based at least in part on using measurements of different RE offsets of a wideband, frequency-selective beam rather than measurements of a plurality of discrete frequency division multiplexed reference signals, the BS may achieve a finer level of beam management or beam refinement. Based at least in part on achieving a finer level of beam management or beam refinement, the BS and the UE may reduce a likelihood of interference, improve a channel quality, reduce communication overhead, or improve network performance, among other examples.

Figure 6:
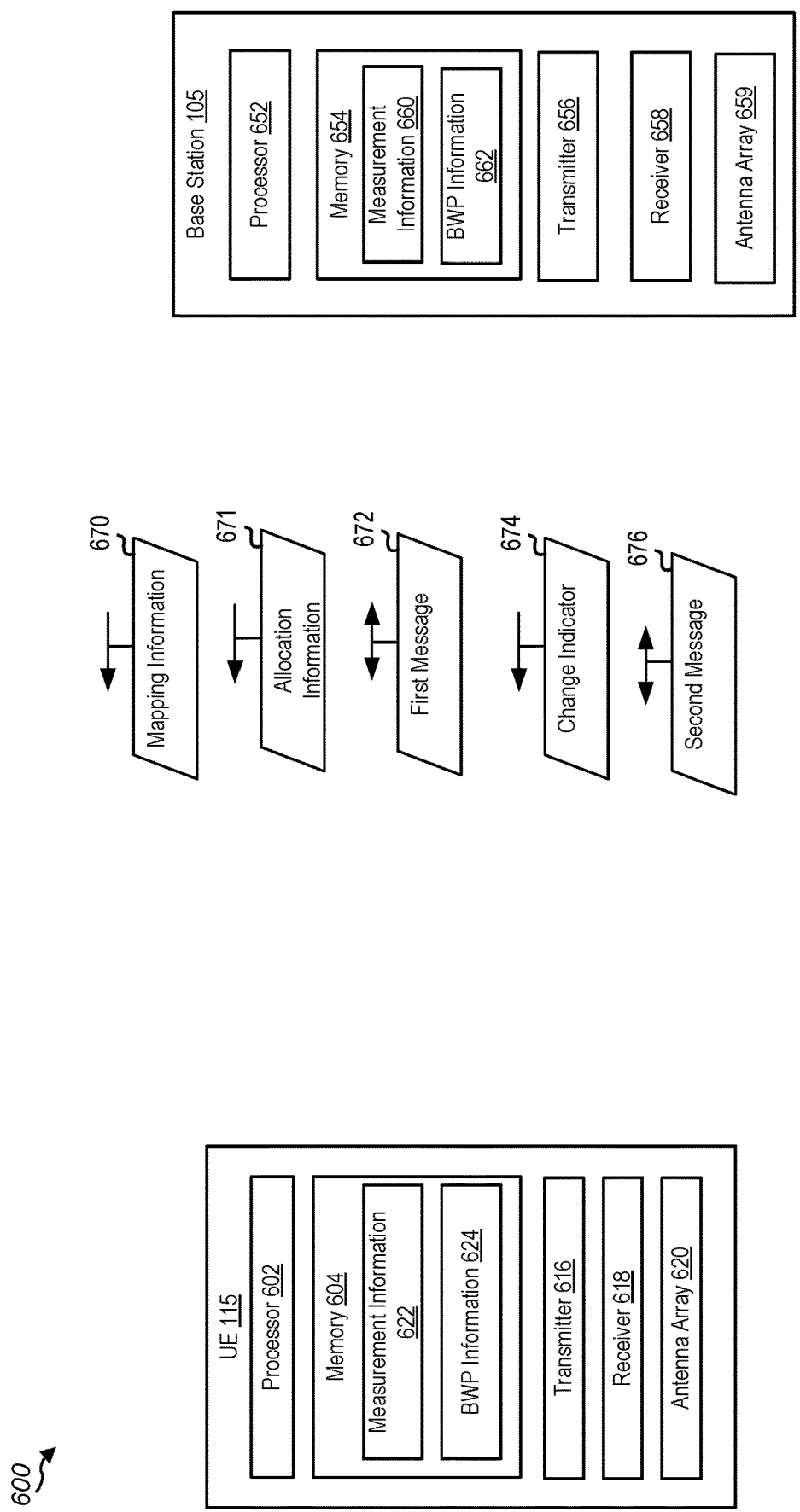
FIG. 6 is a block diagram illustrating an example system that supports bandwidth part (BWP) switching according to one or more aspects of the present disclosure.

FIG. 6 is a block diagram of an example wireless communications system 600 that supports BWP switching according to one or more aspects of the present disclosure. In some examples, the wireless communications system 600 may implement aspects of the wireless network 100. The wireless communications system 600 includes the UE 115 and the base station 105. Although one UE 115 and one base station 105 are illustrated, in some other implementations, the wireless communications system 600 may generally include multiple UEs 115, and may include more than one base station 105.

The UE 115 can include a variety of components (such as structural, hardware components) used for carrying out one or more functions described herein. For example, these components can include one or more processors 602 (hereinafter referred to collectively as "the processor 602"), one or more memory devices 604 (hereinafter referred to collectively as "the memory 604"), one or more transmitters 616 (hereinafter referred to collectively as "the transmitter 616"), one or more receivers 618 (hereinafter referred to collectively as "the receiver 618"), and one or more antenna arrays 620 (hereinafter referred to collectively as "the antenna array 620"). The processor 602 may be configured to execute instructions stored in the memory 604 to perform the operations described herein. In some implementations, the processor 602 includes or corresponds to one or more of the receive processor 258, the transmit processor 264, and the controller 280, and the memory 604 includes or corresponds to the memory 282.

The memory 604 may include or be configured to store measurement information 622 and BWP information 624. The measurement information 622 includes data associated with one or more measurements of one or more references signals. For example, the one or more reference signals may be transmitted by the base station 105 and received by the UE 115 via a plurality of sub-bands of a frequency band during or after an initial access procedure with the base station 105. Additionally, or alternatively, the one or more reference signals may be transmitted by the UE 115 and received by the base station 105 via a plurality of sub-bands of a frequency band during or after an initial access procedure with the UE 115. The BWP information 624 includes data associated with one or more BWPs. The one or more BWPs may be allocated, assigned, or available to the UE 115. In some implementations, the BWP information may indicate, for a first BWP of multiple BWPs, first resource block (RB) start offset and a first number of RBs associated with the first BWP. The first RB start offset may indicate an initial RB, a last RB, or a center RB. Additionally, or alternatively, the BWP information 624 may include or be updated to indicate a second RB start offset associated with the first BWP, a second number of RBs associated with the first BWP associated with the first BWP, or both. In some implementations, the BWP information 624 may indicate, for each BWP of multiple BWPs allocated to the UE 115, whether the BWP is associated with beam directionality. Additionally, or alternatively, the BWP information 624 may an activation pattern of one or more BWPs, of the multiple BWPs, that are associated with beam directionality, one or more BWPs, of the multiple BWPs, that are not associated with beam directionality, or a combination thereof.

May include mapping information 670, as described further herein, beam information, or a combination thereof. The mapping information 670 may indicate, for each BWP of multiple BWPs, a mapping between a respective beam direction of multiple beam directions and the BWP. The beam information may indicate one or more beams and, for each beam of the one or more beams, one or more beam characteristics. For example, the one or more beam characteristics of a beam may include angle information associated with a beam direction of the beam. To illustrate, the angle information may indicate an angle of departure (AoD), an angle of arrival (AoA), a minimum angle, a maximum angle, a value associated with a center frequency of a BWP of the multiple BWPs mapped to the respective beam direction associated with the angle information, or a combination thereof.

In some implementations, memory 604 may include capability information UE capability information to the base station, the UE capability information indicating that the UE supports multiple active downlink BWPs, multiple active uplink BWPs, or a combination thereof.

The transmitter 616 is configured to transmit reference signals, control information and data to one or more other devices, and the receiver 618 is configured to receive references signals, synchronization signals, control information and data from one or more other devices. For example, the transmitter 616 may transmit signaling, control information and data to, and the receiver 618 may receive signaling, control information and data from, the base station 105. In some implementations, the transmitter 616 and the receiver 618 may be integrated in one or more transceivers. Additionally or alternatively, the transmitter 616 or the receiver 618 may include or correspond to one or more components of the UE 115 described with reference to FIG. 2.

The antenna array 620 may include multiple antenna elements configured to perform wireless communications with other devices, such as with the base station 105. In some implementations, the antenna array 620 may be configured to perform wireless communications using different beams, also referred to as antenna beams. The beams may include TX beams and RX beams. To illustrate, the antenna array 620 may include multiple independent sets (or subsets) of antenna elements (or multiple individual antenna arrays), and each set of antenna elements of the antenna array 620 may be configured to communicate using a different respective beam that may have a different respective direction than the other beams. For example, a first set of antenna elements of the antenna array 620 may be configured to communicate via a first beam having a first direction, and a second set of antenna elements of the antenna array 620 may be configured to communicate via a second beam having a second direction. In other implementations, the antenna array 620 may be configured to communicate via more than two beams. Alternatively, one or more sets of antenna elements of the antenna array 620 may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array 620 may include or correspond to multiple antenna panels, and each antenna panel may be configured to communicate using a different respective beam.

In some implementations, the antenna array 620 may include leaky wave antennas or true time delay antennas. In some implementations, the antenna array 620 is configurable to perform frequency-domain beam sweeping, such as true-time-delay beamforming, as described with reference to FIG. 5. Accordingly, the antenna array 620 may be configured to send or receive a wideband signal with different parts of the signal focused in different directions, such that each portion of the wideband signal has power in particular direction.

The base station 105 can include a variety of components (such as structural, hardware components) used for carrying out one or more functions described herein. For example, these components can include one or more processors 652 (hereinafter referred to collectively as "the processor 652"), one or more memory devices 654 (hereinafter referred to collectively as "the memory 654"), one or more transmitters 656 (hereinafter referred to collectively as "the transmitter 656"), one or more receivers 658 (hereinafter referred to collectively as "the receiver 658"), and one or more antenna arrays 659 (hereinafter referred to collectively as "the antenna array 659"). The processor 652 may be configured to execute instructions stored in the memory 654 to perform the operations described herein. In some implementations, the processor 652 includes or corresponds to one or more of the receive processor 238, the transmit processor 220, and the controller 240, and the memory 654 includes or corresponds to the memory 242.

The memory 654 includes or is configured to store measurement information 600 and BWP information 662. The measurement information 660 may include or correspond to the measurement information 622. In some implementations, the measurement information 660 may include measurement information for multiple UEs. The BWP information 662 may include or correspond to the BWP information 624. In some implementations, the BWP information 660 may include BWP information for multiple UEs.

The transmitter 656 is configured to transmit reference signals, synchronization signals, control information and data to one or more other devices, and the receiver 658 is configured to receive reference signals, control information and data from one or more other devices. For example, the transmitter 656 may transmit signaling, control information and data to, and the receiver 658 may receive signaling, control information and data from, the UE 115. In some implementations, the transmitter 656 and the receiver 658 may be integrated in one or more transceivers. Additionally or alternatively, the transmitter 656 or the receiver 658 may include or correspond to one or more components of base station 105 described with reference to FIG. 2.

The antenna array 659 may include multiple antenna elements configured to perform wireless communications with other devices, such as with the UE 115. In some implementations, the antenna array 659 may be configured to perform wireless communications using different beams, also referred to as antenna beams. The beams may include TX beams and RX beams. To illustrate, the antenna array 659 may include multiple independent sets (or subsets) of antenna elements (or multiple individual antenna arrays), and each set of antenna elements of the antenna array 659 may be configured to communicate using a different respective beam that may have a different respective direction than the other beams. For example, a first set of antenna elements of the antenna array 659 may be configured to communicate via a first beam having a first direction, and a second set of antenna elements of the antenna array 659 may be configured to communicate via a second beam having a second direction. In other implementations, the antenna array 659 may be configured to communicate via more than two beams. Alternatively, one or more sets of antenna elements of the antenna array 659 may be configured to concurrently generate multiple beams, for example using multiple RF chains of the base station 105. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array 659 may include or correspond to multiple antenna panels, and each antenna panel may be configured to communicate using a different respective beam.

In some implementations, the wireless communications system 600 implements a 5G New Radio (NR) network. For example, the wireless communications system 600 may include multiple 5G-capable UEs 115 and multiple 5G-capable base stations 105, such as UEs and base stations configured to operate in accordance with a 5G NR network protocol such as that defined by the 3GPP.

During operation of the wireless communications system 600, the UE 115 receives mapping information 670 from the base station 105. In some implementations, the UE 115 may receive a radio resource control (RRC) message, a downlink control information (DCI), or a medium access control-control element (MAC-CE) that includes the mapping information 670. The mapping information 670 may indicate, for each BWP of multiple BWPs, a mapping between a respective beam direction of multiple beam directions and the BWP. For example, the multiple BWPs indicated by the mapping information 670 may be associated with reception by the UE 115 or transmission by the base station 105 of different respective parts of a wideband signal in different respective directions. To illustrate, the mapping information 670 may indicate that a first BWP maps to a first beam direction of the multiple beam directions, and a second BWP maps to the second beam direction.

In some implementations, the mapping information 670 may indicate, for each beam direction of the multiple beam directions, angle information associated with the beam direction. To illustrate, the angle information may indicate an AoD, an AoA, a minimum angle, a maximum angle, a value associated with a center frequency of a BWP of the multiple BWPs mapped to the respective beam direction associated with the angle information, or a combination thereof.

In some implementations, the base station 105 generates the mapping information 670. For example, the base station 105 may generate the mapping information 670 based on the measurement information 660. The mapping information 670 may be UE specific or cell specific.

The UE 115 may also receive allocation information 671 from the base station 105. The allocation information 671 may include an allocation of the first BWP of the multiple BWPs. In some implementations, for each BWP of the multiple BWPs allocated to the UE 115, the UE 115 may receive an indicator associated with the BWP indicating whether the BWP is associated with beam directionality. Additionally, or alternatively, the UE 115 may receive an indicator associated with an activation pattern of one or more BWPs, of the multiple BWPs, that are associated with beam directionality, one or more BWPs, of the multiple BWPs, that are not associated with beam directionality, or a combination thereof.

Based on the allocation information 671, the UE 115 may configure the antenna array 620. For example, the UE 115 may configure the antenna array 620 such that a first beam having a first beam direction is associated with the first BWP.

After receiving the allocation information 671, the UE 115 may communicate one or more first messages, such as a representative first message 672. For example, the UE 115 may communicate the first message 672 with the base station 105, via the first BWP, using a first beam having the first beam direction. To illustrate, the UE 115 may receive, from the base station 105 via the first BWP, the one or more first messages using the first beam having the first beam direction. As another example, the UE 115 may transmit, to the base station 105 via the first BWP, the one or more first messages using the first beam having the first beam direction.

After receiving the allocation information 671, the UE 115 may receive, from the base station, a change indicator 674 associated with a second BWP of the multiple BWPs or a second beam direction of the multiple beam directions. In some implementations, the UE 115 may receive a DCI or a MAC-CE that includes the change indicator 674. The UE 115 may use the mapping information 670 and may determine the second BWP maps and the second beam direction based on the change indicator 674. It is noted that an indication to change one of a beam ID or a BWP ID, may imply the change the other of the beam ID or the BWP (based on the mapping).

Based on the change indicator 674, the UE 115 may configure the antenna array 620. For example, the UE 115 may configure the antenna array 620 such that a second beam having a second beam direction is associated with the second BWP.

After receiving the change indicator 674, the UE 115 may communicate one or more second messages, such as a representative second message 676. For example, the UE 115 may communicate the second message 676 with the base station 105, via the second BWP, using the second beam having the second beam direction. To illustrate, the UE 115 may receive, from the base station 105 via the second BWP, the one or more second messages using the second beam having the second beam direction. As another example, the UE 115 may transmit, to the base station 105 via the second BWP, the one or more second messages using the second beam having the second beam direction.

In some implementations, during or after an initial access procedure with the base station 105, the UE 115 may receive one or more reference signals via a plurality of sub-bands of a frequency band. For example, the one or more reference signals may be received via a frequency domain beam sweeping configuration. In some implementations, the one or more reference signals may include SSB, CSI-RS, or a combination thereof. Additionally, the one or more reference signals may be transmitted by the base station 105 via the antenna array 659, such as a conventional array, a true-time-delay antenna array, or a leaky wave antenna array, or may be received by the UE 115 via the antenna array 620. The base station 105 may store measurement information based on the one or more reference signals as the measurement information 660. Additionally, or alternatively, during or after an initial access procedure with the UE 115, the base station 105 may receive one or more reference signals via a plurality of sub-bands of a frequency band. For example, the one or more reference signals may be received via a frequency domain beam sweeping configuration. In some implementations, the one or more reference signals may include one or multiple uplink (UL) signals, such as a wideband SRS. Additionally, the one or more reference signals may be transmitted by the UE 115 via the antenna array 620, such as a conventional array, a true-time-delay antenna array, or a leaky wave antenna array, or may be received by the base station 105 via the antenna array 659.

The UE 115 may receive the one or more reference signals and generate a report that indicates a preferred sub-band or requests a BWP. For example, the UE 115 may report which sub-bands the UE 115 can receive the one or more reference signals most effectively and may request to place its BWP in the corresponding sub-bands. The UE 115 may transmit the report including sub-band information to the base station. In some implementations, the report may include a request to allocate, to the UE 115, one or more BWPs of the multiple BWPs to one or more sub-bands. Additionally, or alternatively, the UE 115 may send one or more wideband reference signals and the base station 105 may detect signal strengths of the one or more wideband reference signals to select a sub-band to be allocated as a BWP to the UE 115.

In some implementations, transmitting UE capability information to the base station, the UE capability information indicating that the UE supports multiple active downlink BWPs, multiple active uplink BWPs, or a combination thereof. during or after an initial access procedure with the base station.

In some implementations, the base station 105 may transmit an RRC message to the UE 105 that indicates a configuration associated with a first RB start offset and a first number of RBs associated with the first BWP. The first RB start offset may indicate a first initial RB, a first last RB, or a first center RB. The UE 115 may store the configuration as part of the BWP information, such as RB information associate with the first BWP. Additionally, or alternatively, the base station 105 may transmit a DCI or a MAC-CE including control information indicating a second RB start offset, a second number of RBs associated with the first BWP, or both. The second RB start offset may indicate a second initial RB, a second RB, or a second center RB. Accordingly BWP information, such as RB information, may be updated or changed for a BWP and the UE 115 may operate according to the updated BWP information. In some implementations, the UE receives the first message 672 via the first BWP based on the BWP information, the first message 672 received prior to the second message 676. For example, the UE 115 may receive at least one message, such as the first messages 672, via the first BWP based on the first RB start offset, the first number of RBs, or both. Additionally, or alternatively, the UE 115 may receive at least one message, such as the second message 676, via the second BWP based on the second RB start offset, the second number of RBs, or both.

In some implementations, the UE 115 may receive from the base station 105, for each BWP of the multiple BWPs allocated to the UE 105, an indicator associated with the BWP indicating whether the BWP is associated with beam directionality. For one or more BWPs that are not associated with beam directionality, such as one or more BWPs for which no frequency-domain beam sweep is adopted, the one or more BWPs may be activated in a subset of slots (the beam direction across BW is the same in a symbol). Additionally, or alternatively, the UE 115 may receive, from the base station, an indicator associated with an activation pattern of one or more BWPs, of the multiple BWPs, that are associated with beam directionality, one or more BWPs, of the multiple BWPs, that are not associated with beam directionality, or a combination thereof. To illustrate, the activation pattern may be a semi-static (periodic) time-domain pattern for activation and deactivation of a BWP. For example, time domain multiplexed SSBs or CSI-RS may be transmitted via a DL BWP to enable beam or BWP selection. In this case, the activation of the DL BWP (used for measurements) may follow the periodic pattern.

As described with reference to FIG. 6, the present disclosure provides techniques for BWP operations. The UE 115 may use the antenna array 620, such as a true-time-delay array architecture, to efficiently support BWP operations. Additionally, the base station 105 may use the antenna array 659, such as a true-time-delay array architecture, to support BWP operations with multiple UEs simultaneously while keeping analog beamforming architecture. As the UE 115 moves around with respect to the base station 105, the serving beam of the UE 115 may need to be adapted. In such situations, the base station 105 may transmit the change indicator 674 to enable to enable a gradual change in beam direction for the UE 115.

FIG. 7 is a flow diagram illustrating an example process 700 that supports BWP switching according to one or more aspects of the present disclosure. Operations of the process 700 may be performed by a UE, such as the UE 115 described above with reference to FIGS. 1-6 or a UE as described with reference to FIG. 9. For example, example operations (also referred to as "blocks") of the process 700 may enable the UE 115 to support BWP switching.

In block 702, the UE 115 receives, from a base station, mapping information indicating, for each BWP of multiple BWPs, a mapping between a respective beam direction of multiple beam directions and the BWP. For example, the UE 115 may receive the mapping information 607 from the base station 105. In some implementations, the UE 115 receives a first control message including the mapping information. For example, the first control message may include an RRC message, DCI, or a MAC-CE. In some implementations, the multiple BWPs indicated by the mapping information are associated with reception by the UE 115 or transmission by the base station 105 of different parts of a wideband signal in different directions.

In block 704, the UE 115 receives, from the base station, an allocation of a first BWP of the multiple BWPs, the mapping information indicating that the first BWP maps to a first beam direction of the multiple beam directions. For example, the allocation may include or correspond to the BWP information 624, the BWP information 662, or the allocation information 671.

In block 706, the UE 115 communicates, with the base station via the first BWP, one or more first messages using a first beam having the first beam direction. For example, the one or more first messages may include or correspond to the first message 672. To illustrate, the UE 115 may receive, from the base station via the first BWP, the one or more first messages using the first beam having the first beam direction. As another example, the UE 115 may transmit, to the base station via the first BWP, the one or more first messages using the first beam having the first beam direction.

In block 708, the UE 115 receives, from the base station, a change indicator associated with a second BWP of the multiple BWPs or a second beam direction of the multiple beam directions, the mapping information indicating that the second BWP maps to the second beam direction. For example, the UE 115 may receive the change indicator 674 from the base station 105. In some implementations, the UE 115 may receive a second control message including the change indicator. The second control message may include DCI or a MAC-CE.

In block 710, the UE 115 communicates, with the base station via the second BWP, one or more second messages using a second beam having the second beam direction. For example, the one or more second message may include or correspond to the second message 676. To illustrate, the UE 115 may receive, from the base station via the second BWP, the one or more second messages using the second beam having the second beam direction. As another example, the UE 115 may transmit, to the base station via the second BWP, the one or more second messages using the second beam having the second beam direction.

In some implementations, the UE 115 includes an antenna array, such as the antenna array 620. The antenna array may include leaky wave antennas or true time delay antennas. Additionally, or alternatively, the base station may include an antenna array, such as leaky wave antennas or true time delay antennas.

In some implementations, the mapping information indicates, for each beam direction of the multiple beam directions, angle information associated with the beam direction. The angle information may indicate an AoD, an AoA, a minimum angle, a maximum angle, a value associated with a center frequency of a BWP of the multiple BWPs mapped to the respective beam direction associated with the angle information, or a combination thereof.

In some implementations, the UE 115 receives an RRC message indicating a configuration. The configuration may indicate a first RB start offset and a first number of RBs associated with the first BWP. The first RB start offset may indicate an initial RB, a last RB, or a center RB. Additionally, or alternatively, the UE 115 may receive DCI or a MAC-CE including control information indicating a second RB start offset or a second number of RBs associated with the second BWP. In some implementations, in response to receiving the DCI or the MAC-CE, the UE 115 may update BWP information associated with the second BWP. The UE 115 may communicate at least one message of the one or more second messages based on the updated BWP information associated with the second BWP. Additionally, or alternatively, the UE 115 may communicate at least one message of the one or more first messages based on BWP information that is associated with the configuration.

In some implementations, the UE 115 receives, for each BWP allocated to the UE, an indicator associated with the BWP and indicating whether the BWP is associated with beam directionality. Additionally, or alternatively, the UE 115 may receive an RRC message, DCI, or a MAC-CE that includes an indicator associated with an activation pattern of one or more BWP that are associated with beam directionality, one or more BWPs that are not associated with beam directionality, or a combination thereof.

In some implementations, the UE 115 may transmit UE capability information to the base station 105. The UE capability information may indicate that the UE supports multiple active downlink BWPs, multiple active uplink BWPs, or a combination thereof. Additionally, or alternatively, the UE 115 may receive, during or after an initial access procedure with the base station 105, one or more reference signals via a plurality of sub-bands of a frequency band. The UE 115 may transmit, to the base station 105, sub-band information based on one or more measurements of the one or more reference signals and a request to allocate, to the UE, one or more BWPs of the multiple BWPs to one or more sub-bands of the plurality of sub-bands.

FIG. 8 is a flow diagram illustrating an example process 800 that supports BWP switching according to one or more aspects of the present disclosure. Operations of the process 800 may be performed by a base station, such as the base station 105 described above with reference to FIGS. 1-6 or a base station as described with reference to FIG. 10. For example, example operations of the process 800 may enable the base station 105 to support BWP switching.

In block 802, the base station 105 transmitting, to a UE, mapping information indicating, for each BWP of multiple BWPs, a mapping between a respective beam direction of multiple beam directions and the BWP. For example, the base station 105 may transmit the mapping information 607 to the UE 115. In some implementations, the base station 105 transmits a first control message including the mapping information. For example, the first control message may be included in or indicated by an RRC message, DCI, or a MAC-CE. In some implementations, the multiple BWPs indicated by the mapping information are associated with reception by the UE 115 or transmission by the base station 105 of different parts of a wideband signal in different directions.

In block 804, the base station 105 transmits, to the UE, an allocation of a first BWP of the multiple BWPs, the mapping information indicating that the first BWP maps to a first beam direction of the multiple beam directions. For example, the allocation may include or correspond to the BWP information 624, the BWP information 662, or the allocation information 671.

In block 806, the base station 105 communicates, with the UE via the first BWP, one or more first messages using a first beam having the first beam direction. For example, the one or more first messages may include or correspond to the first message 672. To illustrate, the base station 105 may receive, from the UE via the first BWP, the one or more first messages using the first beam having the first beam direction. As another example, the base station 105 may transmit, to the UE via the first BWP, the one or more first messages using the first beam having the first beam direction.

In block 808, the base station 105 transmits, to the UE, a change indicator associated with a second BWP of the multiple BWPs or a second beam direction of the multiple beam directions, the mapping information indicating that the second BWP maps to the second beam direction. For example, the base station 105 may transmit the change indicator 674 to the UE 115. In some implementations, the base station 105 may transmit a second control message including the change indicator. The second control message may include DCI or a MAC-CE.

In block 810, the base station 105 communicates, with the UE via the second BWP, one or more second messages using a second beam having the second beam direction. For example, the one or more second message may include or correspond to the second message 676. To illustrate, the base station 105 may receive, from the UE via the second BWP, the one or more second messages using the second beam having the second beam direction. As another example, the base station 105 may transmit, to the UE via the second BWP, the one or more second messages using the second beam having the second beam direction.

In some implementations, the mapping information indicates, for each beam direction of the multiple beam directions, angle information associated with the beam direction. For example, the angle information may indicate an angle of departure (AoD), an angle of arrival (AoA), a minimum angle, a maximum angle, a value associated with a center frequency of a BWP of the multiple BWPs mapped to the respective beam direction associated with the angle information, or a combination thereof.

In some implementations, the base station 105 transmits an RRC message indicating a configuration. The configuration may indicate a first RB start offset and a first number of RBs associated with the first BWP. The first RB start offset may indicate an initial RB, a last RB, or a center RB. Additionally, or alternatively, the base station 105 may transmit a DCI or a MAC-CE that includes control information indicating a second RB start offset or a second number of RBs associated with the second BWP. In some implementations, the base station 105 may communicate at least one message of the one or more first messages via the first BWP based on the configuration. Additionally, or alternatively, the base station 105 may communicate at least one message of the one or more second messages via the second BWP based on the control information.

In some implementations, the base station 105 transmits, for each BWP allocated to the UE, an indicator associated with the BWP and indicating whether the BWP is associated with beam directionality. Additionally, or alternatively, the base station 105 may transmit an indicator associated with an activation pattern of one or more BWP that are associated with beam directionality, one or more BWPs that are not associated with beam directionality, or a combination thereof. The indicator indicating whether the BWP is associated with beam directionality or the indicator associated with an activation pattern may be included in an RRC message, DCI, or a MAC-CE.

In some implementations, the base station 105 may receive UE capability information from the UE 115. The UE capability information may indicate that the UE supports multiple active downlink BWPs, multiple active uplink BWPs, or a combination thereof. Additionally, or alternatively, the base station 105 may transmit, during or after an initial access procedure with the UE 115, one or more reference signals via a plurality of sub-bands of a frequency band. In some implementations, the UE 115 may generate sub-band information based on one more sub-band measurements performed on the one or more reference signals. For example, the sub-band information may include or correspond to the measurement information 622 or the measurement information 660. The base station 105 may receive, from the UE 115, the sub-band information and a request to allocate, to the UE 115, one or more BWPs of the multiple BWPs to one or more sub-bands of the plurality of sub-bands.

Figure 9:
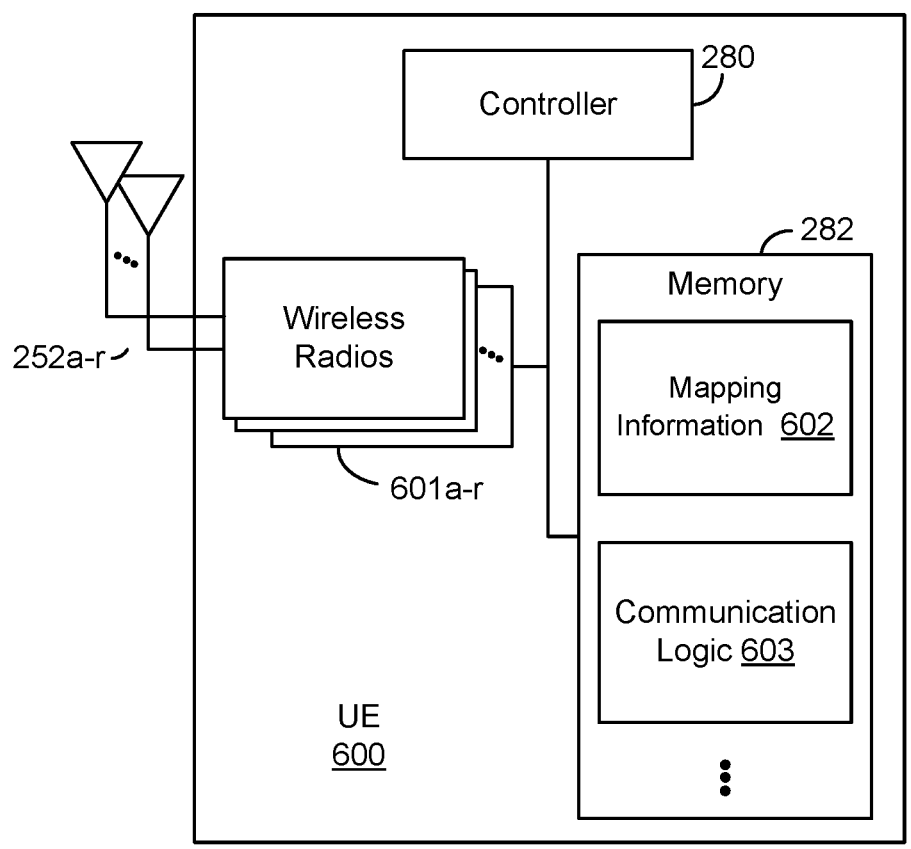
FIG. 9 is a block diagram of an example UE that supports BWP switching according to one or more aspects of the present disclosure.

FIG. 9 is a block diagram of an example UE 900 that supports BWP switching according to one or more aspects of the present disclosure. The UE 900 may be configured to perform operations, including the blocks of the process 700 described with reference to FIG. 7. In some implementations, the UE 900 includes the structure, hardware, and components shown and described with reference to the UE 115 of FIG. 2 or 6. For example, the UE 900 includes the controller 280, which operates to execute logic or computer instructions stored in the memory 282, as well as controlling the components of the UE 900 that provide the features and functionality of the UE 900. The UE 900, under control of the controller 280, transmits and receives signals via wireless radios 901a-r and the antennas 252a-r. The wireless radios 901a-r include various components and hardware, as illustrated in FIG. 2 for the UE 115, including the modulator and demodulators 254a-r, the MIMO detector 256, the receive processor 258, the transmit processor 264, and the TX MIMO processor 266.

As shown, the memory 282 may include mapping information 902 and communication logic 903. The mapping information 902 may include or correspond to BWP information 616, BWP information 662, or mapping information 670. The communication logic 903 may be configured to perform one or more operations associated with wireless communication, such as sending or receiving data or messages. The UE 900 may receive signals from or transmit signals to one or more network entities, such as the base station 105 of FIGS. 1, 2, 6, or a base station as illustrated in FIG. 10.

In some implementations, the UE 900 may be configured to perform the process 700 of FIG. 7. To illustrate, the UE 900 may execute, under control of the controller 280, the communication logic 903, stored in the memory 282. The execution environment of the communication logic 902 provides the functionality to perform at least the operations in block 702, 704, 706, 708, 710.

Figure 10:
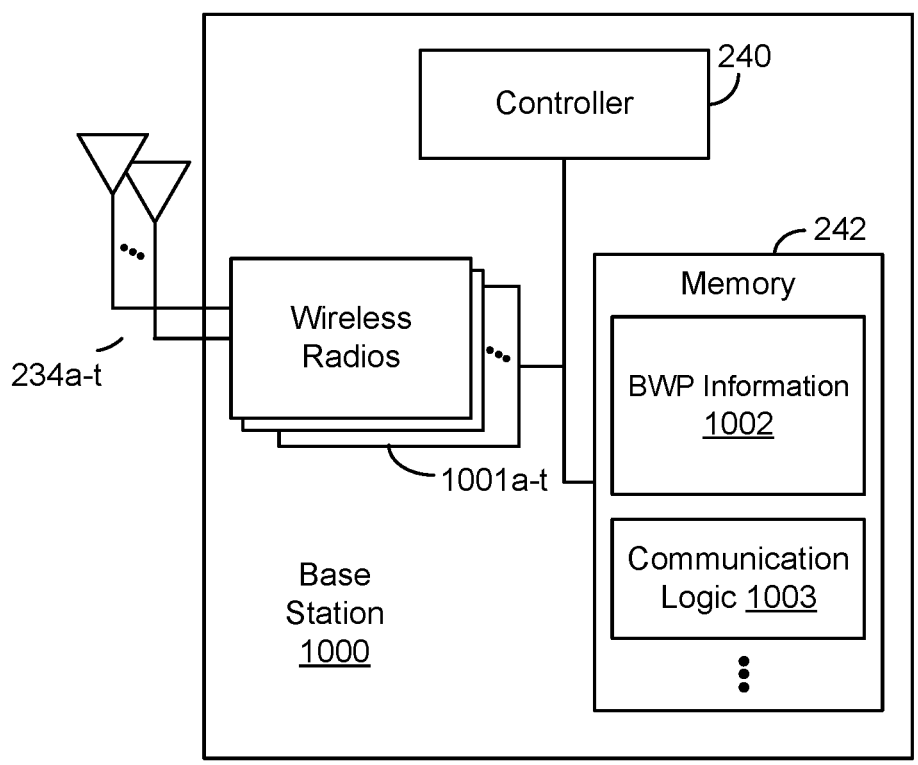
FIG. 10 is a block diagram of an example base station that supports BWP switching according to one or more aspects of the present disclosure.

FIG. 10 is a block diagram of an example base station 1000 that supports BWP switching according to one or more aspects of the present disclosure. The base station 1000 may be configured to perform operations, including the blocks of the process 800 described with reference to FIG. 8. In some implementations, the base station 1000 includes the structure, hardware, and components shown and described with reference to the base station 105 of FIGS. 1, 2, 6. For example, the base station 1000 may include the controller 240, which operates to execute logic or computer instructions stored in the memory 242, as well as controlling the components of the base station 1000 that provide the features and functionality of the base station 1000. The base station 1000, under control of the controller 240, transmits and receives signals via wireless radios 1001a-t and the antennas 234a-t. The wireless radios 1001a-t include various components and hardware, as illustrated in FIG. 2 for the base station 105, including the modulator and demodulators 232a-t, the transmit processor 220, the TX MIMO processor 230, the MIMO detector 236, and the receive processor 238.

As shown, the memory 242 may include mapping information 1002 and communication logic 1003. The mapping information 1002 may include or correspond to BWP information 616, BWP information 662, or mapping information 670. The communication logic 1003 may be configured to perform one or more operations associated with wireless communication, such as sending or receiving data or messages. The base station 1000 may receive signals from or transmit signals to one or more UEs, such as the UE 115 of FIGS. 1, 2, 6 or the UE 900 of FIG. 9.

In some implementations, the base station 1000 may be configured to perform the process 800 of FIG. 8. To illustrate, the base station 1000 may execute, under control of the controller 240, the communication logic 1003, stored in the memory 242. The execution environment of the communication logic 1003 provides the functionality to perform at least the operations in block 802, 804, 806, 808, 810.

It is noted that one or more blocks (or operations) described with reference to FIGS. 7 and 8 may be combined with one or more blocks (or operations) described with reference to another of the figures. For example, one or more blocks (or operations) of FIG. 7 may be combined with one or more blocks (or operations) of FIG. 8. As another example, one or more blocks associated with FIG. 7 may be combined with one or more blocks (or operations) associated with FIG. 1, 2, or 6. Additionally, or alternatively, one or more operations described above with reference to FIG. 1, 2, or 6 may be combined with one or more operations described with reference to FIG. 9 or 10.

In some aspects, techniques for supporting BWP switching may include additional aspects, such as any single aspect or any combination of aspects described below or in connection with one or more other processes or devices described elsewhere herein. In a first aspect, techniques for supporting BWP switching may include receiving, from a base station, mapping information indicating, for each BWP of multiple BWPs, a mapping between a respective beam direction of multiple beam directions and the BWP; receiving, from the base station, an allocation of a first BWP of the multiple BWPs, the mapping information indicating that the first BWP maps to a first beam direction of the multiple beam directions; communicating, with the base station via the first BWP, one or more first messages using a first beam having the first beam direction; receiving, from the base station, a change indicator associated with a second BWP of the multiple BWPs or a second beam direction of the multiple beam directions, the mapping information indicating that the second BWP maps to the second beam direction; and communicating, with the base station via the second BWP, one or more second messages using a second beam having the second beam direction. In some examples, the techniques in the first aspect may be implemented in a method or process. In some other examples, the techniques of the first aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a second aspect, in combination with the first aspect, an antenna array of the UE or the base station includes leaky wave antennas or true time delay antennas.

In a third aspect, in combination with one or more of the first aspect or the second aspect, the multiple BWPs indicated by the mapping information are associated with reception by the UE or transmission by the base station of different respective parts of a wideband signal in different respective directions.

In a fourth aspect, in combination with one or more of the first aspect through the third aspect, the mapping information indicates, for each beam direction of the multiple beam directions, angle information associated with the beam direction, the angle information indicating an AoD, an AoA, a minimum angle, a maximum angle, a value associated with a center frequency of a BWP of the multiple BWPs mapped to the respective beam direction associated with the angle information, or a combination thereof.

In a fifth aspect, in combination with one or more of the first aspect through the fourth aspect, the techniques further include receiving a RRC message indicating a configuration. In some implementations of the fifth aspect, the configuration indicating a first RB start offset and a first number of RBs associated with the first BWP.

In a sixth aspect, in combination with the fifth aspect, the first RB start offset indicates an initial RB, a last RB, or a center RB.

In a seventh aspect, in combination with one or more of the first aspect through the sixth aspect, the techniques further include receiving a DCI or a MAC-CE including control information indicating a second RB start offset or a second number of RBs associated with the second BWP.

In an eighth aspect, in combination with the seventh aspect, the techniques further include, in response to receiving the DCI or the MAC-CE, updating BWP information associated with the first BWP.

In a ninth aspect, in combination with the eighth aspect, at least one message of the one or more second messages is communicated based on the updated BWP information associated with the second BWP.

In a tenth aspect, in combination with one or more of the first aspect through the ninth aspect, the mapping information is received in a first RRC message, a first DCI, or a first MAC-CE.

In an eleventh aspect, in combination with one or more of the first aspect through the tenth aspect, the change indicator is received in a second DCI or a second MAC-CE.

In a twelfth aspect, in combination with one or more of the first aspect through the eleventh aspect, the techniques further include for each BWP of the multiple BWPs allocated to the UE, receiving an indicator associated with the BWP indicating whether the BWP is associated with beam directionality.

In a thirteenth aspect, in combination with one or more of the first aspect through the twelfth aspect, the techniques further include receiving an indicator associated with an activation pattern of one or more BWPs, of the multiple BWPs, that are associated with beam directionality, one or more BWPs, of the multiple BWPs, that are not associated with beam directionality, or a combination thereof.

In a fourteenth aspect, in combination with one or more of the first aspect through the thirteenth aspect, the techniques further include transmitting UE capability information to the base station.

In a fifteenth aspect, in combination with the fourteenth aspect, the UE capability information indicating that the UE supports multiple active downlink BWPs, multiple active uplink BWPs, or a combination thereof.

In a sixteenth aspect, in combination with one or more of the first aspect through the fifteenth aspect, the techniques further include receiving, during or after an initial access procedure with the base station, one or more reference signals via a plurality of sub-bands of a frequency band.

In a seventeenth aspect, in combination with the fifteenth aspect, the techniques further include transmitting, to the base station, sub-band information based on one or more measurements of the one or more reference signals and a request to allocate, to the UE, one or more BWPs of the multiple BWPs to one or more sub-bands of the plurality of sub-bands.

In some aspects, techniques for supporting BWP switching may include additional aspects, such as any single aspect or any combination of aspects described below or in connection with one or more other processes or devices described elsewhere herein. In a an eighteenth aspect, techniques for supporting BWP switching may include transmitting, to a UE, mapping information indicating, for each BWP of multiple BWPs, a mapping between a respective beam direction of multiple beam directions and the BWP; transmitting, to the UE, an allocation of a first BWP of the multiple BWPs, the mapping information indicating that the first BWP maps to a first beam direction of the multiple beam directions; communicating, with the UE via the first BWP, one or more first messages using a first beam having the first beam direction; transmitting, to the UE, a change indicator associated with a second BWP of the multiple BWPs or a second beam direction of the multiple beam directions, the mapping information indicating that the second BWP maps to the second beam direction; and communicating, with the UE via the second BWP, one or more second messages using a second beam having the second beam direction. In some examples, the techniques in the eighteenth aspect may be implemented in a method or process. In some other examples, the techniques of the eighteenth aspect may be implemented in a wireless communication device such as a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a nineteenth aspect, in combination with the eighteenth aspect, an antenna array of the UE or the base station includes leaky wave antennas or true time delay antennas, and.

In a twentieth aspect, in combination with the eighteenth aspect or the nineteenth aspect, the multiple BWPs indicated by the mapping information are associated with reception by the UE or transmission by the base station of different respective parts of a wideband signal in different respective directions.

In a twenty-first aspect, in combination with one or more of the eighteenth aspect through the twentieth aspect, the mapping information indicates, for each beam direction of the multiple beam directions, angle information associated with the beam direction, the angle information indicating an AoD, an AoA, a minimum angle, a maximum angle, a value associated with a center frequency of a BWP of the multiple BWPs mapped to the respective beam direction associated with the angle information, or a combination thereof.

In a twenty-second aspect, in combination with one or more of the eighteenth aspect through the twenty-first aspect, the techniques further include transmitting a RRC message indicating a configuration, the configuration indicating a first RB start offset and a first number of RBs associated with the first BWP.

In a twenty-third aspect, in combination with the twenty-second aspect, the first RB start offset indicating an initial RB, a last RB, or a center RB.

In a twenty-fourth aspect, in combination with one or more of the eighteenth aspect through the twenty-third aspect, the techniques further include transmitting a DCI or a MAC-CE including control information indicating a second RB start offset or a second number of RBs associated with the second BWP.

In a twenty-fifth aspect, in combination with the twenty-fourth aspect, at least one message of the one or more second messages is communicated via the second BWP based on the control information.

In a twenty-sixth aspect, in combination with one or more of the eighteenth aspect through the twenty-fifth aspect, the mapping information is transmitted in a first RRC message, a first DCI, or a first MAC-CE.

In a twenty-eighth aspect, in combination with one or more of the eighteenth aspect through the twenty-seventh aspect, the change indicator is transmitted in a second DCI or a second MAC-CE.

In a twenty-ninth aspect, in combination with one or more of the eighteenth aspect through the twenty-eighth aspect, the techniques further include transmitting, during or after an initial access procedure with the UE, one or more reference signals via a plurality of sub-bands of a frequency band.

In a thirtieth aspect, in combination with the twenty-ninth aspect, the techniques further include receiving, from the UE, sub-band information based on one or more measurements of the one or more reference signals and a request to allocate, to the UE, one or more BWPs of the multiple BWPs to one or more sub-bands of the plurality of sub-bands.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a user equipment (UE), the method comprising:
    receiving, from a network entity, mapping information indicating respective associations between a set of bandwidth parts (BWPs) and a set of beam directions, each BWP of the set of BWPs being associated with a respective beam direction of the set of beam directions, the set of BWPs including a first BWP associated with a first beam direction of the set of beam directions and a second BWP associated with a second beam direction of the set of beam directions;
    receiving, from the network entity, an indication to switch from the first BWP to the second BWP or an indication to switch from the first beam direction to the second beam direction; and
    switching from the first BWP to the second BWP and from the first beam direction to the second beam direction based on the indication and the mapping information.

2. The method of claim 1, further comprising:
    configuring an antenna array such that a first beam having the first beam direction is associated with the first BWP and such that a second beam having the second beam direction is associated with the second BWP.

3. The method of claim 1, further comprising:
    communicating, with the network entity via the first BWP, one or more first messages using a first beam having the first beam direction; and
    communicating, with the network entity via the second BWP, one or more second messages using a second beam having the second beam direction.

4. The method of claim 3, further comprising:
    receiving, from the network entity, a radio resource control (RRC) message, indicating a configuration associated with a first resource block (RB) offset and a first number of RBs associated with the first BWP, wherein communicating, with the network entity via the first BWP, one or more first messages includes receiving, from the network entity, at least one message of the first one or more messages via the first BWP based on the first RB start offset, the first number of RBs, or a combination thereof.

5. The method of claim 1, wherein the set of beam directions includes multiple beam directions, the multiple beam directions corresponding to a single beam or to multiple beams.

6. The method of claim 5, wherein the mapping information is UE-specific such that a beam corresponds to a transmit beam or a receive beam of the UE.

7. The method of claim 5, wherein the mapping information is cell-specific such that a beam corresponds to resources used by the network entity to communicate, and wherein the resources include synchronization signal blocks (SSBs), channel state information reference signals (CS-RSs), or a combination thereof.

8. The method of claim 1, further comprising:
    receiving, from the network entity, one or more reference signals, wherein the one or more reference signals include synchronization signal blocks (SSBs), channel state information reference signals (CS-RSs), or a combination thereof; and
    transmitting, to the network entity, a report, wherein the report is based on the one or more reference signals, and wherein the report includes a request, to the network entity, to allocate, to the UE, one or more BWPs of multiple BWPs to one or more sub-bands.

9. The method of claim 1, further comprising:
    receiving, from the network entity, an indicator associated with the BWP indicating that the BWP is associated with beam directionality.

10. The method of claim 1, further comprising:
    transmitting, to the network entity, UE capability information indicating that the UE supports multiple active downlink BWPs, multiple active uplink BWPs, or a combination thereof.

11. A user equipment (UE) comprising:
    at least one processor; and
    a memory coupled with the at least one processor and storing processor-readable code that, when executed by the at least one processor, is configured to:
        initiate receipt, from a network entity, of mapping information indicating respective associations between a set of bandwidth parts (BWPs) and a set of beam directions, each BWP of the set of BWPs being associated with a respective beam direction of the set of beam directions, the set of BWPs including a first BWP associated with a first beam direction of the set of beam directions and a second BWP associated with a second beam direction of the set of beam directions;
        initiate receipt, from the network entity, of an indication to switch from the first BWP to the second BWP or an indication to switch from the first beam direction to the second beam direction; and
        switch from the first BWP to the second BWP and from the first beam direction to the second beam direction based on the indication and the mapping information.

12. The UE of claim 11, wherein the processor-readable code that, when executed by the at least one processor, is further configured to:
    configure an antenna array such that a first beam having the first beam direction is associated with the first BWP and such that a second beam having the second beam direction is associated with the second BWP.

13. The UE of claim 11, wherein the processor-readable code that, when executed by the at least one processor, is further configured to:
    initiate communication, with the network entity via the first BWP, of one or more first messages using a first beam having the first beam direction; and
    initiate communication, with the network entity via the second BWP, of one or more second messages using a second beam having the second beam direction.

14. The UE of claim 13, wherein:
    the processor-readable code that, when executed by the at least one processor, is further configured to initiate receipt, from the network entity, of a radio resource control (RRC) message, indicating a configuration associated with a first resource block (RB) offset and a first number of RBs associated with the first BWP, and
to communicate the one or more first messages, the processor-readable code that, when executed by the at least one processor, is further configured to initiate receipt, from the network entity, of at least one message of the first one or more messages via the first BWP based on the first RB start offset, the first number of RBs, or a combination thereof.

15. The UE of claim 11, wherein the set of beam directions includes multiple beam directions, the multiple beam directions corresponding to a single beam or to multiple beams.

16. The UE of claim 15, wherein the mapping information is UE-specific such that a beam corresponds to a transmit beam or a receive beam of the UE.

17. The UE of claim 15, wherein the mapping information is cell-specific such that a beam corresponds to resources used by the network entity to communicate, and wherein the resources include synchronization signal blocks (SSBs), channel state information reference signals (CS-RSs), or a combination thereof.

18. The UE of claim 11, wherein the processor-readable code that, when executed by the at least one processor, is further configured to:
    initiate receipt, from the network entity, of one or more reference signals, wherein the one or more reference signals include synchronization signal blocks (SSBs), channel state information reference signals (CS-RSs), or a combination thereof; and
    initiate transmission, to the network entity, of a report, wherein the report is based on the one or more reference signals, and wherein the report includes a request, to the network entity, to allocate, to the UE, one or more BWPs of multiple BWPs to one or more sub-bands.

19. The UE of claim 11, wherein the processor-readable code that, when executed by the at least one processor, is further configured to:
    initiate receipt, from the network entity, of an indicator associated with the BWP indicating that the BWP is associated with beam directionality.

20. The UE of claim 11, wherein the processor-readable code that, when executed by the at least one processor, is further configured to:
    initiate transmission, to the network entity, of UE capability information indicating that the UE supports multiple active downlink BWPs, multiple active uplink BWPs, or a combination thereof.

21. A method for wireless communication performed by a network entity, the method comprising:
    transmitting, to a user equipment (UE), mapping information indicating respective associations between a set of bandwidth parts (BWPs) and a set of beam directions, each BWP of the set of BWPs being associated with a respective beam direction of the set of beam directions, the set of BWPs including a first BWP associated with a first beam direction of the set of beam directions and a second BWP associated with a second beam direction of the set of beam directions; and
    transmitting, to the UE, an indication to switch from the first BWP to the second BWP or an indication to switch from the first beam direction to the second beam direction.

22. The method of claim 21, further comprising:
    generating the mapping information based on measurement information, wherein the measurement information includes data associated with one or more measurements of one or more reference signals.

23. The method of claim 22, further comprising:
    transmitting, to the UE, the one or more reference signals, wherein the one or more reference signals include synchronization signal blocks (SSBs), channel state information reference signals (CS-RSs), or a combination thereof; and
    receiving, from the UE, a report, wherein the report is based on the one or more reference signals, and wherein the report includes a request to allocate, to the UE, one or more BWPs of the set of BWPs to one or more sub-bands.

24. The method of claim 21, further comprising:
    transmitting, to the UE, an indicator associated with the BWP indicating that the BWP is associated with beam directionality.

25. The method of claim 21, wherein the mapping information is UE-specific such that a beam corresponds to a transmit beam or a receive beam of the UE, or wherein the mapping information is cell-specific such that a beam corresponds to resources used by the network entity to communicate, and wherein the resources include synchronization signal blocks (SSBs), channel state information reference signals (CS-RSs), or a combination thereof.

26. A network entity comprising:
    at least one processor; and
    a memory coupled with the at least one processor and storing processor-readable code that, when executed by the at least one processor, is configured to:
        initiate transmission, to a user equipment (UE), of mapping information indicating respective associations between a set of bandwidth parts (BWPs) and a set of beam directions, each BWP of the set of BWPs being associated with a respective beam direction of the set of beam directions, the set of BWPs including a first BWP associated with a first beam direction of the set of beam directions and a second BWP associated with a second beam direction of the set of beam directions; and
        initiate transmission, to the UE, of an indication to switch from the first BWP to the second BWP or an indication to switch from the first beam direction to the second beam direction.

27. The network entity of claim 26, wherein the processor-readable code that, when executed by the at least one processor, is further configured to:
    generate the mapping information based on measurement information, wherein the measurement information includes data associated with one or more measurements of one or more reference signals.

28. The network entity of claim 27, wherein the processor-readable code that, when executed by the at least one processor, is further configured to:
    initiate transmission, to the UE, of the one or more reference signals, wherein the one or more reference signals include synchronization signal blocks (SSBs), channel state information reference signals (CS-RSs), or a combination thereof; and
    initiate reception, from the UE, of a report, wherein the report is based on the one or more reference signals, and wherein the report includes a request to allocate, to the UE, one or more BWPs of the set of BWPs to one or more sub-bands.

29. The network entity of claim 26, wherein the processor-readable code that, when executed by the at least one processor, is further configured to:

initiate transmission, to the UE, of an indicator associated with the BWP indicating that the BWP is associated with beam directionality.

30. The network entity of claim 26, wherein the mapping information is UE-specific such that a beam corresponds to a transmit beam or a receive beam of the UE, or wherein the mapping information is cell-specific such that a beam corresponds to resources used by the network entity to communicate, and wherein the resources include synchronization signal blocks (SSBs), channel state information reference signals (CS-RSs), or a combination thereof.

* * * * *